(12) United States Patent
Watson

(10) Patent No.: US 9,512,969 B1
(45) Date of Patent: Dec. 6, 2016

(54) MODULAR LED LAMP FIXTURES AND ASSOCIATED ACCESSORIES

(71) Applicant: John J. Watson, Orlando, FL (US)

(72) Inventor: John J. Watson, Orlando, FL (US)

( * ) Notice: Subject to any disclaimer, the term of this patent is extended or adjusted under 35 U.S.C. 154(b) by 501 days.

(21) Appl. No.: 14/168,166

(22) Filed: Jan. 30, 2014

(51) Int. Cl.
*F21V 33/00* (2006.01)
*F21K 99/00* (2016.01)
*G03B 15/02* (2006.01)

(52) U.S. Cl.
CPC ............ *F21K 9/50* (2013.01); *F21V 33/00* (2013.01); *G03B 15/02* (2013.01)

(58) Field of Classification Search
CPC ...... F21V 5/0048; F21V 14/06; F21V 19/042; F21V 19/045; F21V 23/004; F21V 23/005; F21V 29/004; F21V 29/507; F21V 29/508; F21Y 2101/02; F21Y 2111/002; G03B 5/02; G03B 15/041; G03B 15/0484; G03B 15/0442
See application file for complete search history.

(56) References Cited

U.S. PATENT DOCUMENTS

| | | | | |
|---|---|---|---|---|
| 7,566,154 B2* | 7/2009 | Gloisten | ................ | B60Q 3/025 362/240 |
| 7,631,984 B2* | 12/2009 | Martin | ................. | F21L 4/027 362/202 |
| 7,775,686 B2* | 8/2010 | Dalton | ................. | F21L 4/027 362/127 |
| 8,197,085 B2* | 6/2012 | Spartano | ................. | F21L 4/027 315/209 R |
| 8,322,892 B2* | 12/2012 | Scordino | ................. | F21K 9/00 313/24 |
| 2001/0007527 A1* | 7/2001 | Lammers | ................ | F21S 6/002 362/294 |
| 2007/0133197 A1* | 6/2007 | Shiau | ................ | F21L 4/027 362/157 |
| 2009/0323344 A1* | 12/2009 | Crawford | ............... | B29C 70/32 362/253 |
| 2011/0012535 A1* | 1/2011 | West | ..................... | F21L 4/005 315/307 |

* cited by examiner

Primary Examiner — Hargobind S Sawhney
(74) Attorney, Agent, or Firm — Thompson & Knight LLP; James J. Murphy

(57) ABSTRACT

A lamp fixture includes a light emitting diode supported on a front surface of a printed circuit board. A reflector and heat sink includes a rear surface disposed adjacent the front surface of the printed circuit board and an opposing reflective surface defining a reflector dish. An aperture through the reflector and heat sink allows the light emitting diode to extend from the printed circuit board into the reflector dish. An epoxy lens is disposed over and seals the reflector surface and the light emitting diode. A assembly including a base and an inner casing extending from the base supports the printed circuit board and the reflector and heat sink. An outer casing encloses the inner casing and includes an aperture for outputting light transmitted through the epoxy lens from the light emitting diode and the reflective surface.

17 Claims, 34 Drawing Sheets

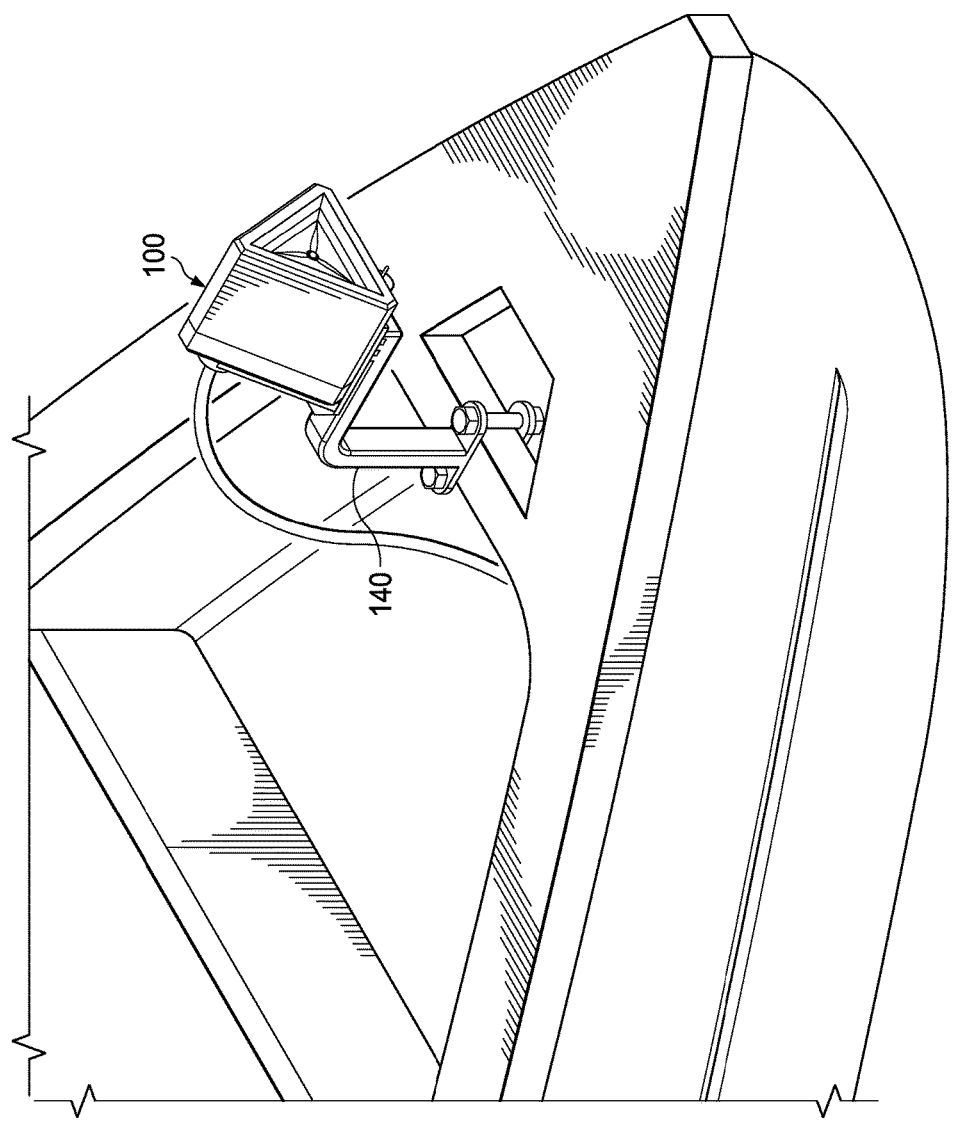

MODULAR LED LAMP FIXTURES AND ASSOCIATED ACCESSORIES

FIELD OF INVENTION

The present invention relates in general to portable lighting, and in particular to modular LED lamp fixtures and associated accessories.

BACKGROUND OF INVENTION

Outdoor recreational athletes, including kayakers, hikers, climbers, bikers, runners, surfers, divers, paddle boarders, anglers, sailors, cave explorers, campers, hunters, dirt bikers, ATV riders, skydivers, BASE jumpers, adventurers, and outdoor photographers all have one thing in common: they have a strong passion for their hobbies and sports, and a desire to capture their adventures on film.

A majority of the people who participate in these activities participate in multiple activities. A large percentage of these participants film and photograph their friends, teams, themselves, or other participants in these activities using digital cameras. Most participants in these activities seek out, purchase or create their own gear and accessories that further their ability to pursue the passion of their sports.

A common problem faced by those engaged in outdoor activities, as well as photographers in general, is the challenge of capturing activities at night or in low light scenarios. A further problem is that it is not always possible to operate a hand-held flash light, nor is it practical or useful to wear a typical headlamp. And yet a further problem is that many digital cameras are not able to capture good video in low light or darkness.

SUMMARY OF INVENTION

The principles of the present invention are embodied in a lamp fixture, which includes a light emitting diode supported on a front surface of a printed circuit board. A reflector and heat sink includes a rear surface disposed adjacent the front surface of the printed circuit board and an opposing reflective surface defining a reflector dish. An aperture through the reflector and heat sink allows the light emitting diode to extend from the printed circuit board into the reflector dish. An epoxy lens is disposed over and seals the reflector surface and the light emitting diode. A assembly including a base and an inner casing extending from the base supports the printed circuit board and the reflector and heat sink. An outer casing encloses the inner casing and includes an aperture for outputting light transmitted through the epoxy lens from the light emitting diode and the reflective surface.

Embodiments of the present principles advantageously provide a waterproof, extremely compact, LED lamp fixture, which along with its associated mounting accessories, can be mounted and configured in a large variety of ways on many different objects. Both the LED lamp fixture and its associated accessories are particularly adapted for use in environments requiring rugged equipment, such as those encountered by outdoor athletes and photographers. In addition, multiple LED lamp fixtures can be clustered together as modules to increase the available lighting power.

BRIEF DESCRIPTION OF DRAWINGS

For a more complete understanding of the present invention, and the advantages thereof, reference is now made to the following descriptions taken in conjunction with the accompanying drawings, in which:

FIG. 14 is a perspective view of the modular LED lamp fixture shown in FIGS. 1A-1E in an exemplary use as light disposed on the bow of a canoe or similar small boat.

DETAILED DESCRIPTION OF THE INVENTION

Figure 1A:
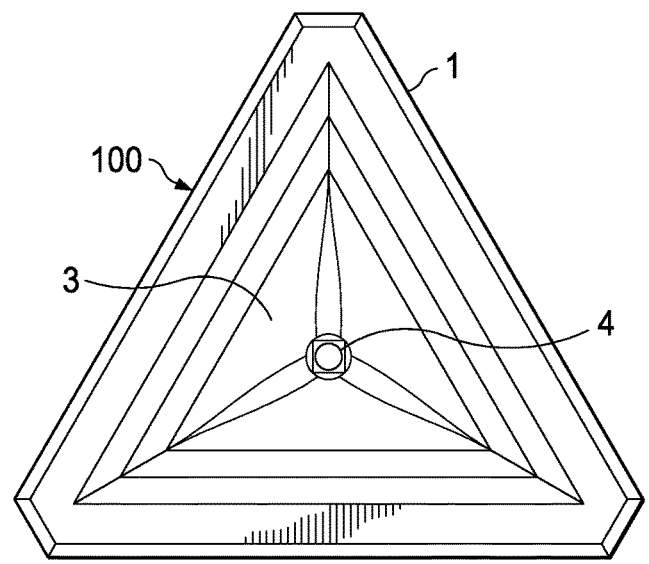
FIGS. 1A-1E are a series of views illustrating a preferred modular LED lamp fixture according to the principles of the present invention.
Figure 1B:
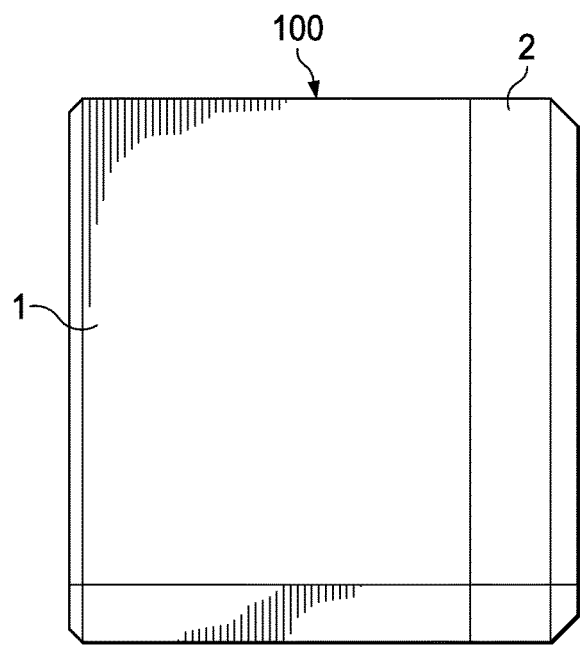
Figure 1C:
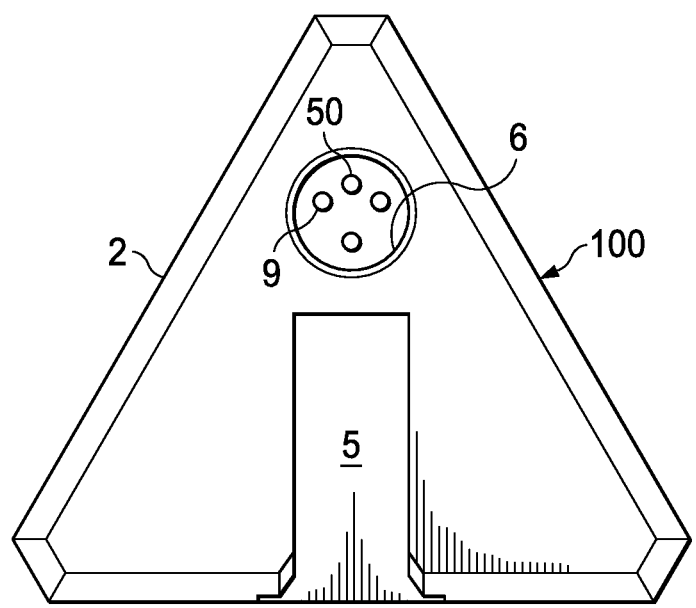

The principles of the present invention and their advantages are best understood by referring to the illustrated embodiment depicted in FIGS. 1-15 of the drawings, in which like numbers designate like parts.

FIGS. 1A-1E are diagrams respectively providing front, right side, back, bottom, and perspective views an exemplary modular LED lamp fixture 100 according to the principles of the present invention. Modular LED lamp fixture 100 includes lamp assembly outer casing 1, lamp inner assembly casing and lamp baseplate 2, a heat sink and light reflector 3, a LED 4, a mounting keyway 5, a power and communications plug receptacle 6 including a communication interface 50 and positive and negative power terminals 9, and an epoxy lens layer 62.

Figure 1D:
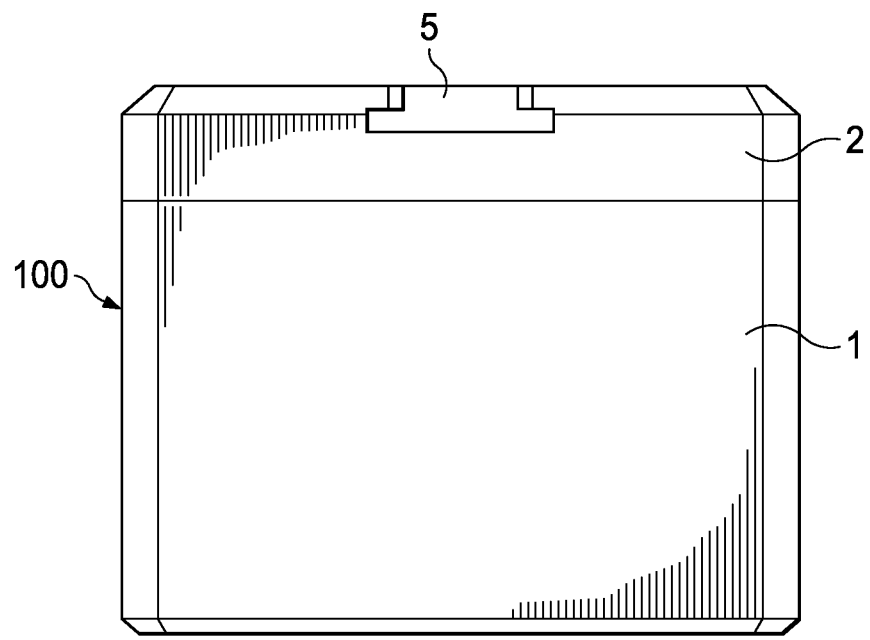
Figure 1E:
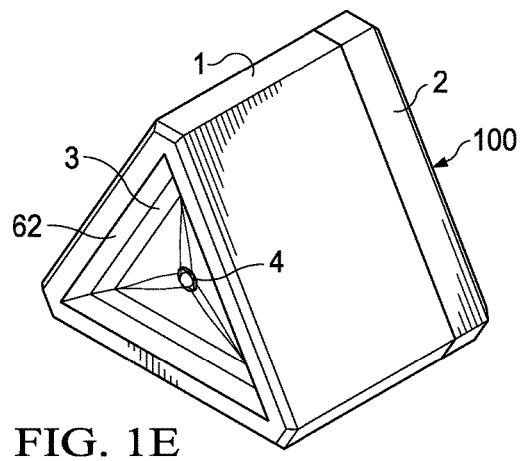
Figure 1F:
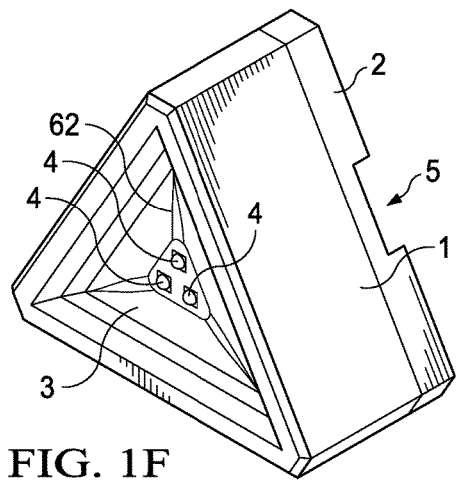
FIG. 1F is a front perspective view of an alternate modular LED lamp fixture using multiple LEDs according to the principles of the present invention.

In the embodiment of FIGS. 1A-1E, modular LED lamp assembly 100 is triangular in shape and has a rigid construction, although the shape can vary in alternate embodiments. A triangular heat sink and light reflector 3 advantageously increases heat transfer from the LED chip and evenly reflects the light outward through clear epoxy lens layer 62. In the preferred embodiment, LED 4 is a single 1000 lumen LED light mounted on an aluminum printed circuit board 8 (FIGS. 2A-2C), although RGB LED diodes or multiple LEDs may also be used in alternate embodiments (FIG. 1F). As shown in FIG. 1D, mounting keyway 5 has a generally T-shaped cross-section allowing for sliding engagement with either a reciprocal T-shaped mounting key or for insertion of a reciprocal mounting key with a simple rectangular shape.

Epoxy lens layer 62 is preferably fabricated by pouring a clear, UV protectant, epoxy over the front surface of heat sink and light reflector 3, LED 4 and aluminum printed circuit board 8. A heat-transfer formulated epoxy poured on the inside chamber of inner assembly casing and lamp baseplate 2 and underneath aluminum printed circuit board 8, which fully encapsulates the electronic circuitry, terminals, components and magnets and secures all lamp assembly components in to place. Advantageously, this encapsulation process leaves zero entry points for contaminants in the construction seams of the lamp body, thus making the entire module water tight to an indefinite depth. (Consequently, the underwater operation depth is primarily limited to the depth rating of the coupling of the power plug and lamp power receptacle discussed below.)

Figure 2A:
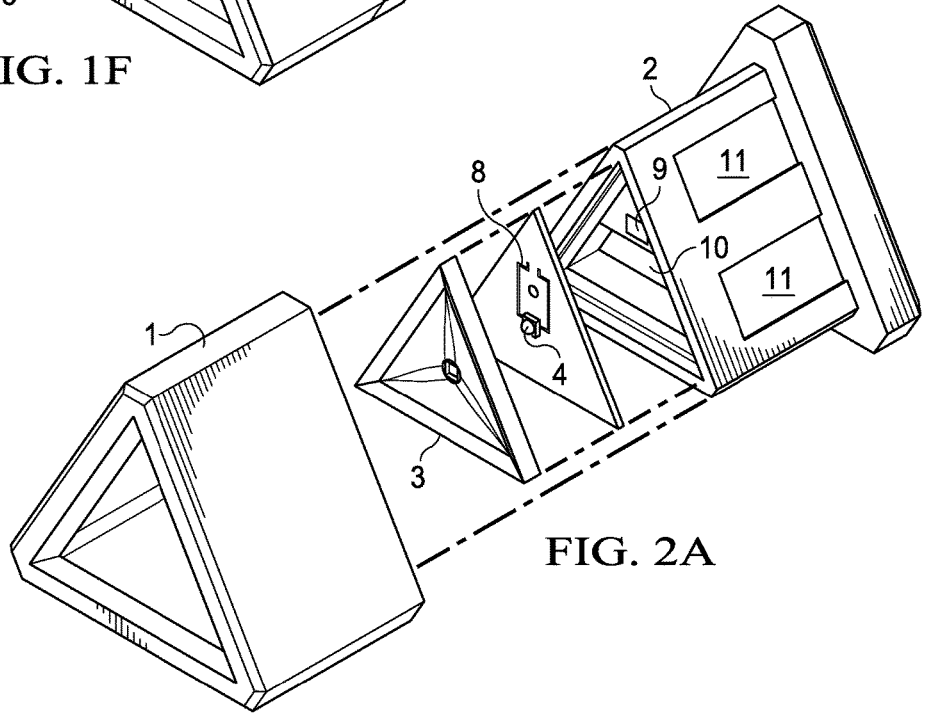
FIG. 2A is an exploded view of the modular LED lamp fixture shown in FIGS. 1A-1E.

FIG. 2A is an exploded view of the modular LED lamp assembly 100, including outer casing 1, heat sink and light reflector 3, aluminum printed circuit board 8, surface mounted LED 4, inner assembly casing—baseplate 2, power terminals 9, an embedded magnet 10 at the end of inner assembly casing and baseplate 2, and embedded magnets 11 in side walls of lamp inner assembly casing and baseplate 2.

In the illustrated embodiment, outer casing 1 is constructed of CNC machined aluminum with a durable outer coating. Inner assembly casing and baseplate 2 is preferably constructed of durable polymer. Embedded magnets 10 and 11 are preferably rare-earth magnets provided in the endwall each of the sidewalls of modular LED lamp fixture 100, although in alternate embodiments different magnets and different magnet locations may be used. Chamfers on outer casing 1 and inner assembly casing—baseplate 2 provide durability and resiliency to the body of modular LED lamp fixture 100.

Figure 2B:
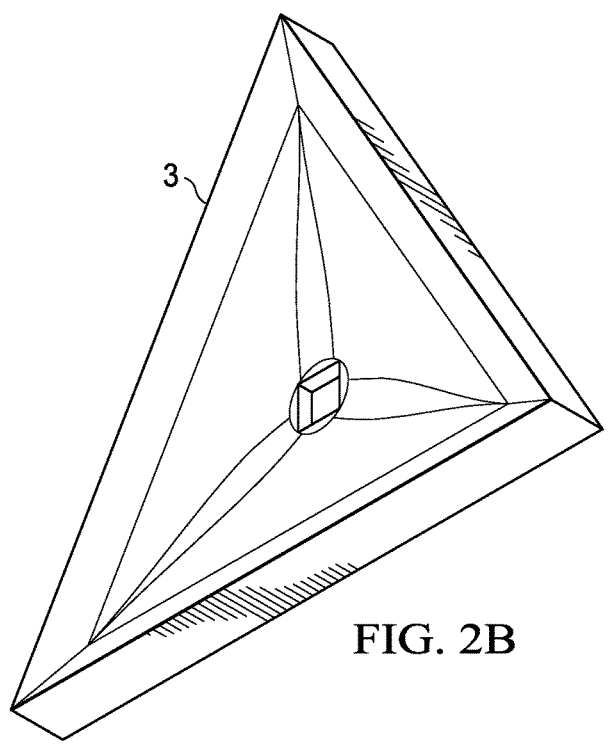
FIGS. 2B-2C are perspective views of the front and back of the heat sink and light reflector shown in FIG. 2A.
Figure 2C:
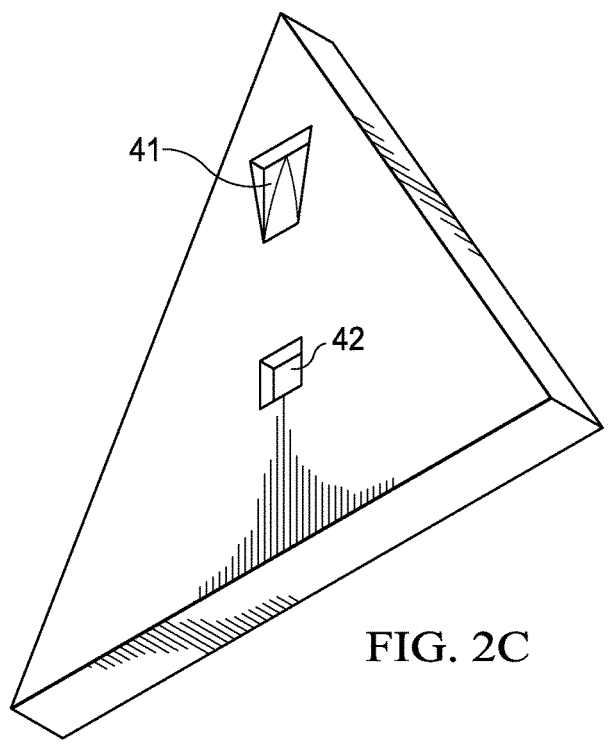
Figure 2D:
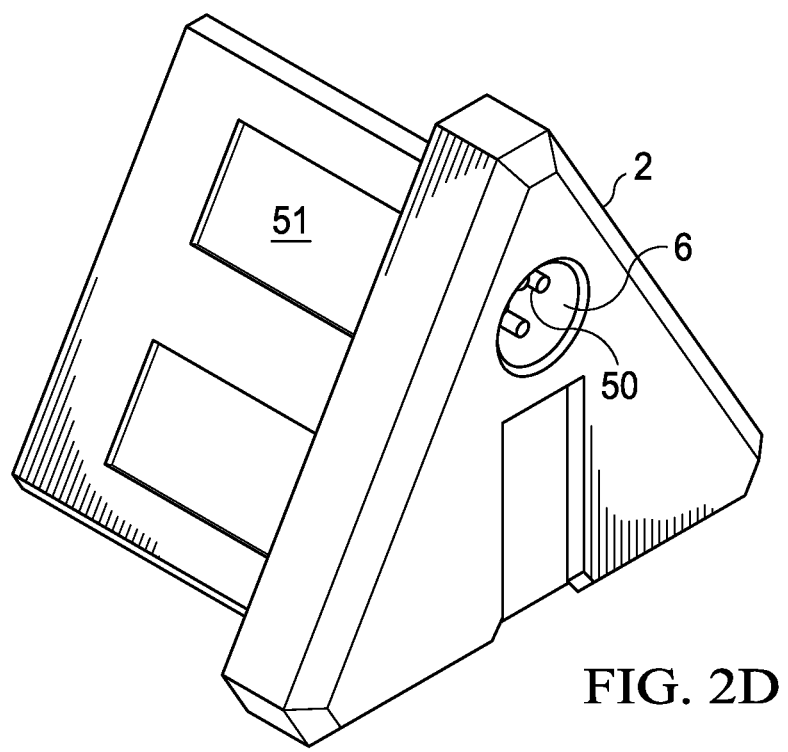
FIG. 2D is a rear perspective view of the lamp inner assembly casing shown in FIG. 2A.

FIGS. 2B and 2C show a detailed view of heat sink and light reflector 3, including an LED cut out 42, and a concaved cutout 41 on the rear surface. FIG. 2D shows a rear perspective view of lamp inner assembly casing 2, communication interface 50 within receptacle 6, and embedded magnet cutouts 51 for receiving magnets 11.

Figure 3:
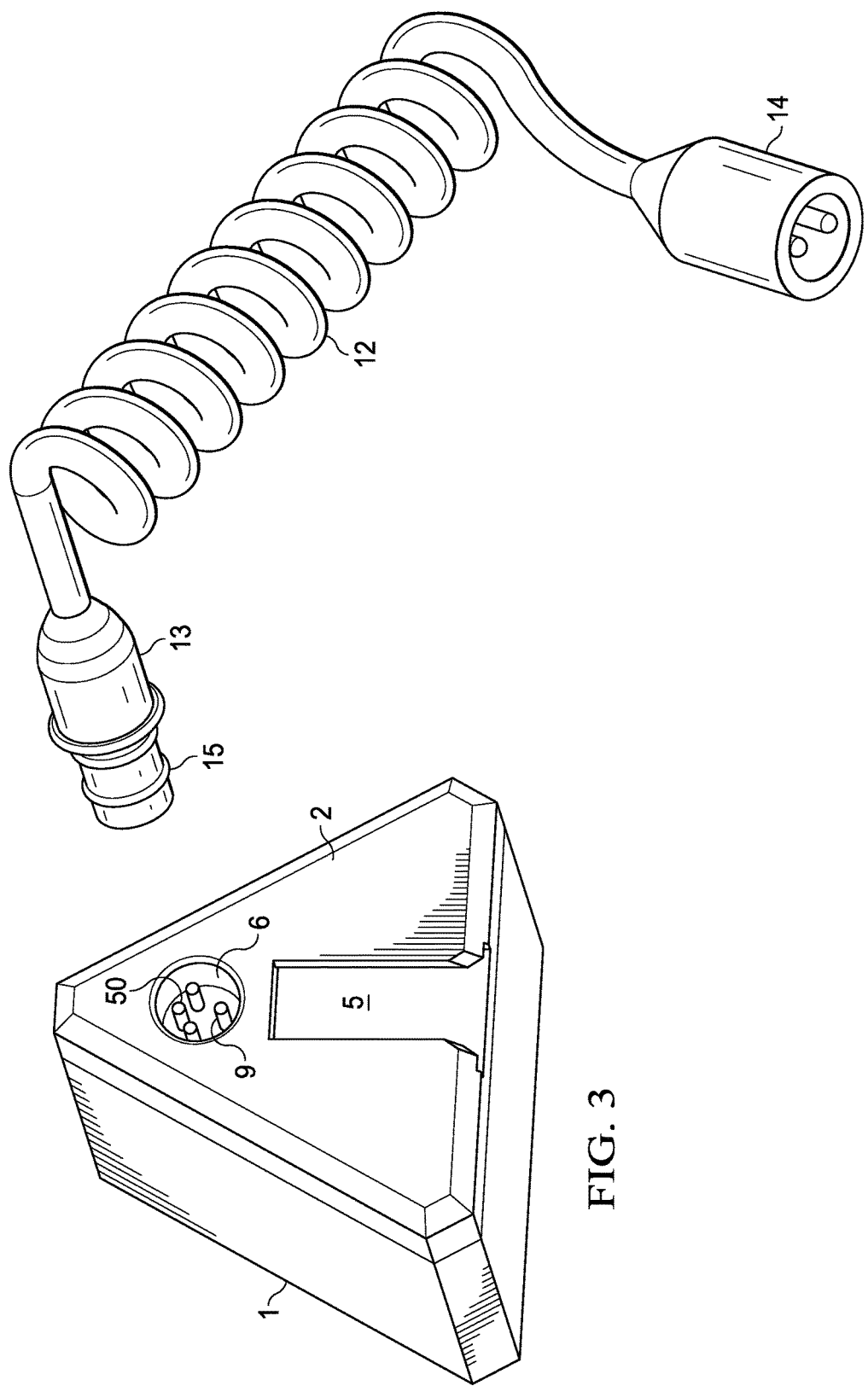
FIG. 3 is a rear perspective view of the modular LED lamp fixture shown in FIGS. 1A-1E and a preferred associated power and communications cord.

FIG. 3 depicts the rear of modular LED lamp assembly 100 in a perspective view, along with a power/communication cable 12, plug connectors 13 and receptacle connector 14. Connector 13 includes a plug 15, which mates with receptacle 6 on modular LED lamp assembly 100. Connector 14 mates with an associated power supply, such as those discussed below.

Figure 4A:
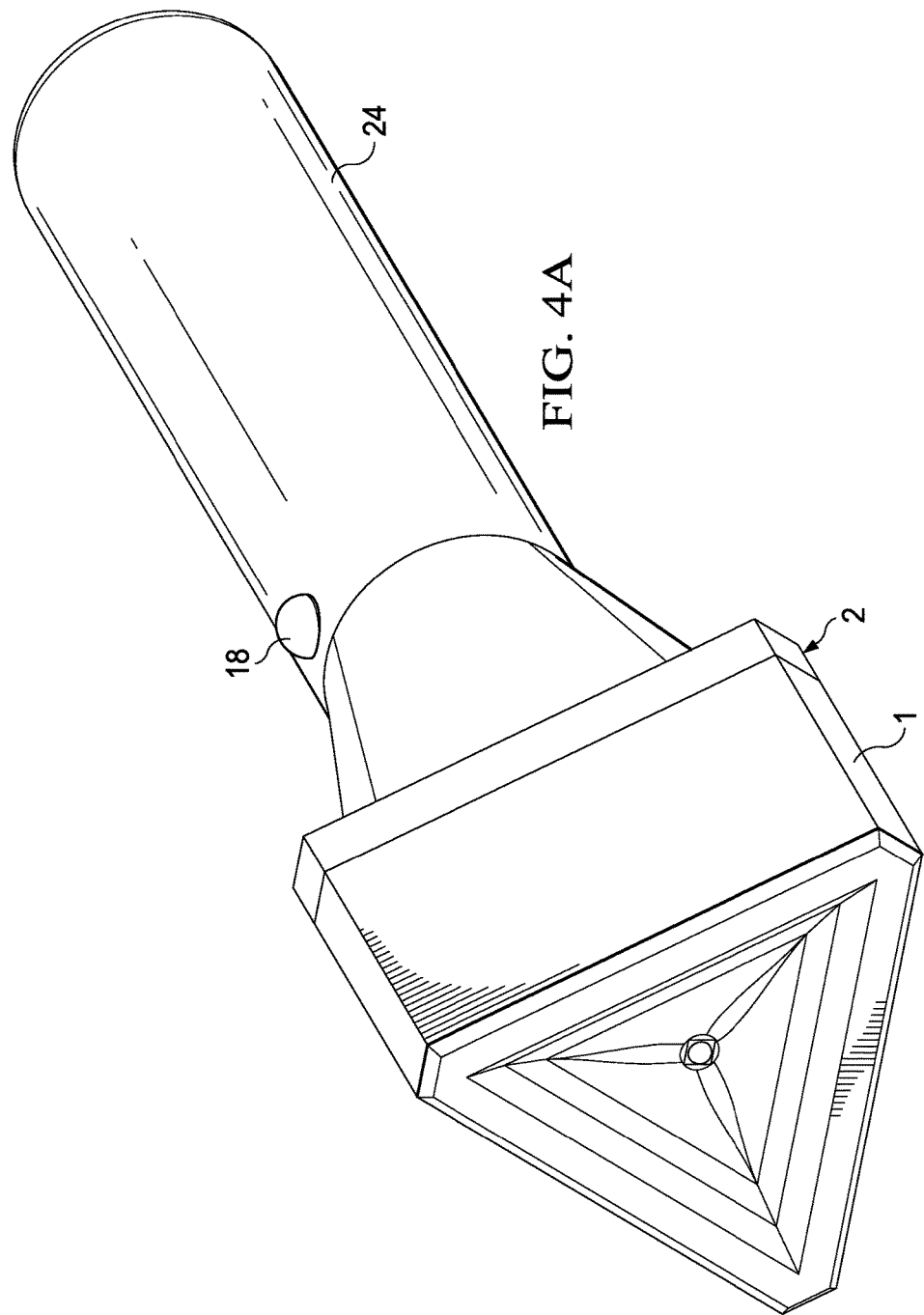
FIG. 4A is a perspective view of the modular LED lamp fixture shown in FIG. 1A-1E connected to a power unit to form an integral lighting unit.
Figure 4B:
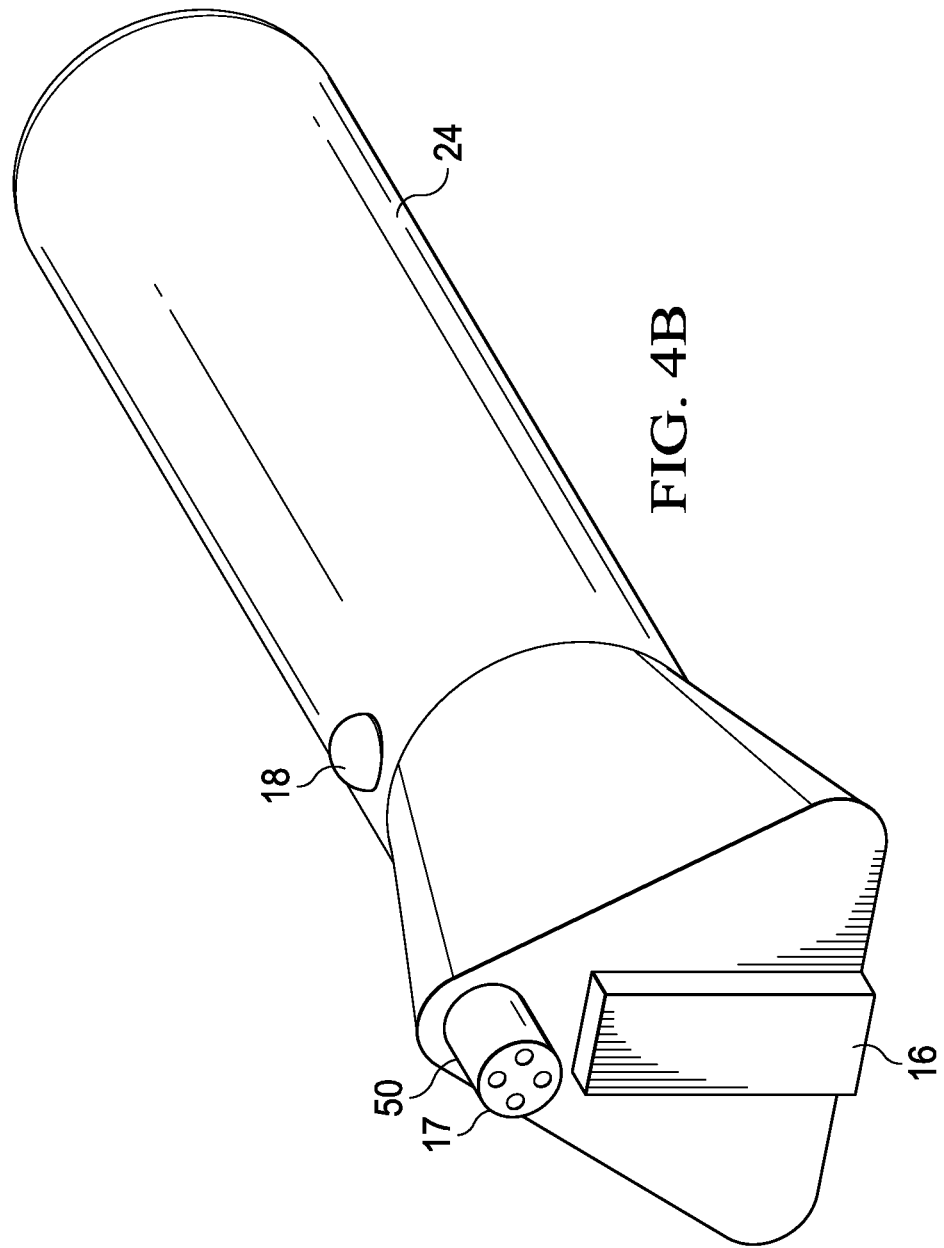
FIG. 4B is a perspective view of the power module unit of FIG. 4A.

FIGS. 4A and 4B depict a power module 24, which mates with modular LED lamp assembly 100 to form a handheld unit, similar to a handheld flashlight. Power module 24 includes lamp mount key 16, electrical plug 17/50 which mates with receptacle 6 on modular LED lamp assembly 100, and waterproof power activation switch 18. Preferably, power module 24 comprises a rigid body enclosure containing Li-ion batteries and associated control logic and circuitry for connecting batteries and other electronic components to modular LED lamp assembly 100.

In the embodiment of FIG. 4B, lamp mounting key 16 is generally rectangular-shaped (e.g., without the lateral extensions found in the T-shaped embodiment) and dimensioned to be securely received by keyway cutout 5 on the back of modular LED lamp assembly 100. To mount modular LED lamp fixture 100 to power module 24, mounting key 16 and electrical connector 17 on power module 24 are respectively inserted into key cutout 5 and electrical connector receptacle 6 on modular LED lamp assembly 100. Key cutout 5 and mounting key 16 provide lateral support, while a latch assembly and/or magnets are used to hold modular LED lamp assembly 100 and power module 24 together. (A magnetic coupling version is discussed below in connection with FIG. 11E.) In some embodiments, power module 24 may also have expansion plugs in order to plug multiple lamps in to the hand held power module.

Figure 4C:
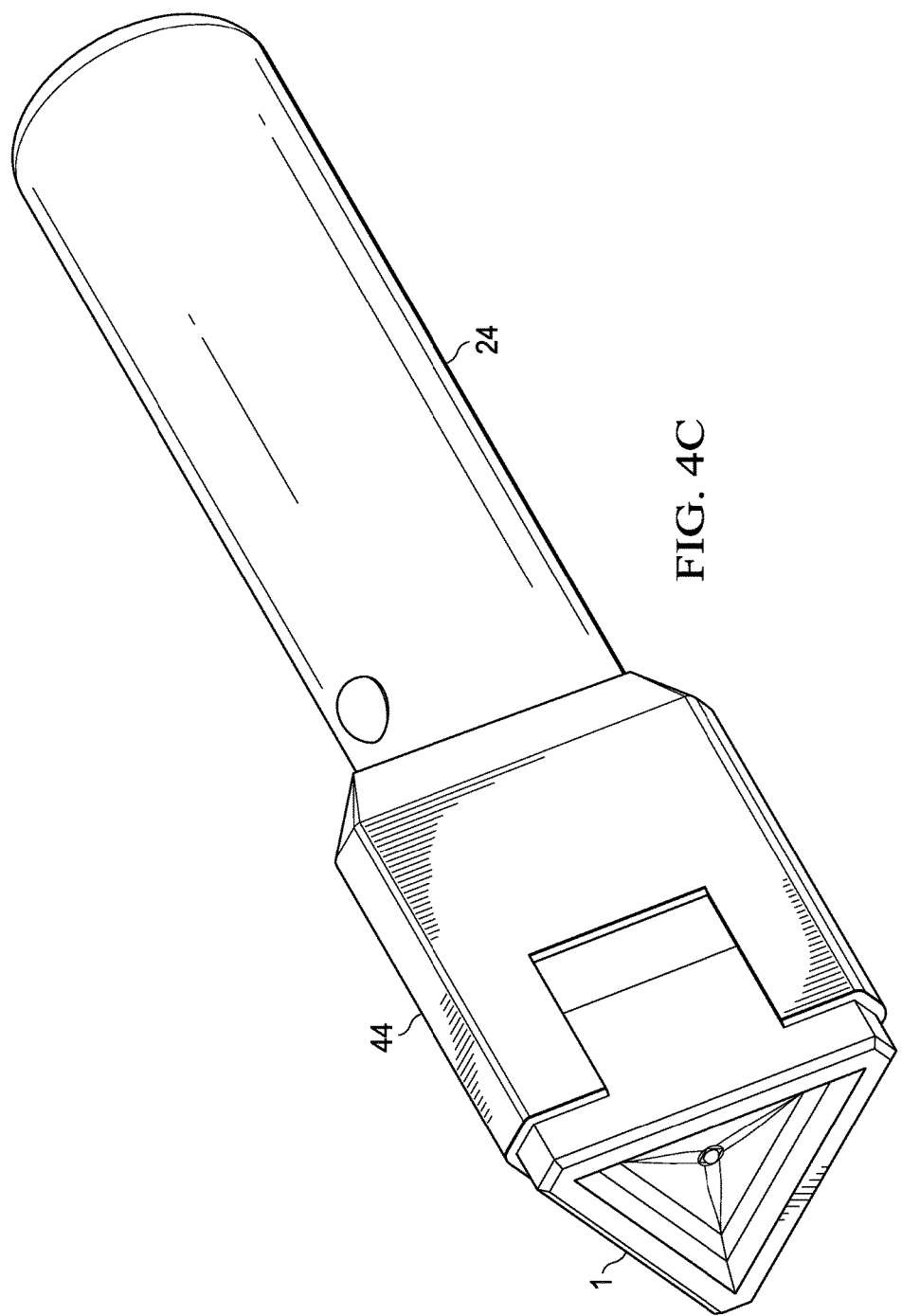
FIG. 4C is a perspective view of an alternate embodiment of the principles of the present invention in which the modular LED lamp fixture shown in FIG. 1A-1E is received in a receptacle on a power unit to form an integral lighting unit.

FIG. 4C illustrates an alternate embodiment of the principles of the present invention in which modular LED lamp fixture 100 is received in a receptacle 44 on power module 24 to form an integral lighting unit. In this embodiment, modular LED lamp fixture 100 slides into receptacle 44 such that electrical plug 17 on power module 24 (FIG. 4B) engages receptacle 6 on modular LED lamp assembly 100 (FIG. 4B).

Figure 5A:
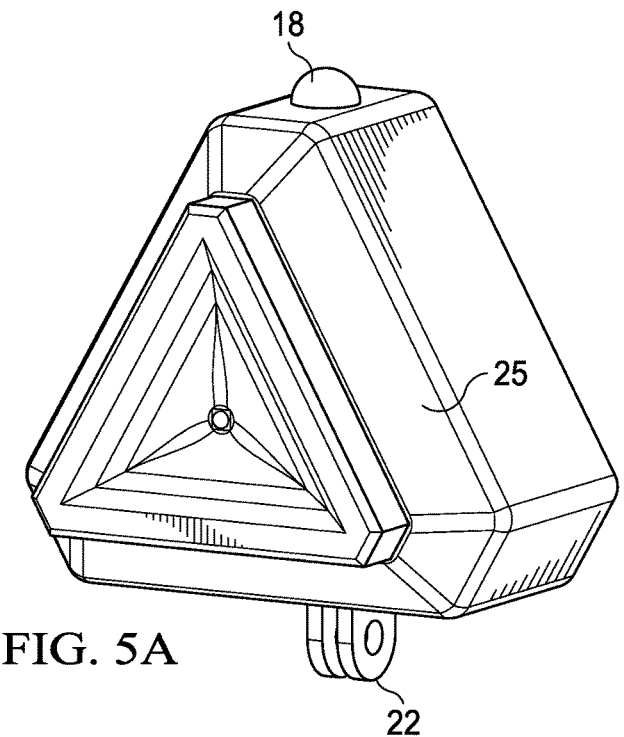
FIGS. 5A-5B are front and rear perspective views of the modular LED lamp fixture shown in FIGS. 1A-1E including an integral power supply and a mounting structure disposed directly on the lamp fixture base.
Figure 5B:
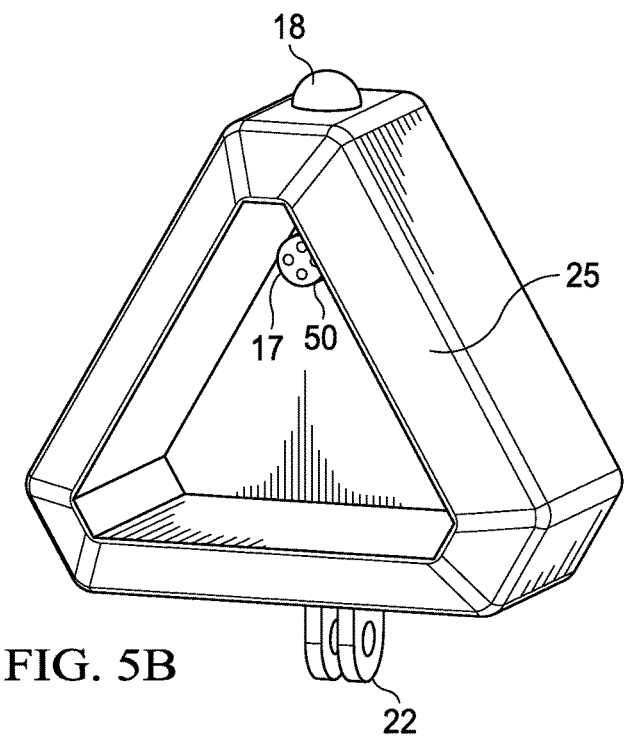

FIGS. 5A and 5B depict an embodiment of modular LED lamp assembly 100 using a universal lamp mount 22 and sport power module 25, which is configured to match the shape of modular LED lamp assembly 100. Sport power module 25 and modular LED lamp assembly 100 are preferably held together with a retractable latch mechanism that locks modular LED lamp assembly 100 to sport power module 25 by engaging with mounting keyway 5, magnets, or similar devices that allow for selective assembly and disassembly of the unit. (Magnetic attachment options are discussed further below.) Electrical plug 17 allows modular LED lamp assembly 100, with battery 25 attached, to also be connected to power source and/or compatible communications interface via a cord or a cable similar to cable 12. Waterproof power switch 18 in alternate embodiments is disposed directly on modular LED lamp assembly 100.

Figure 6A:
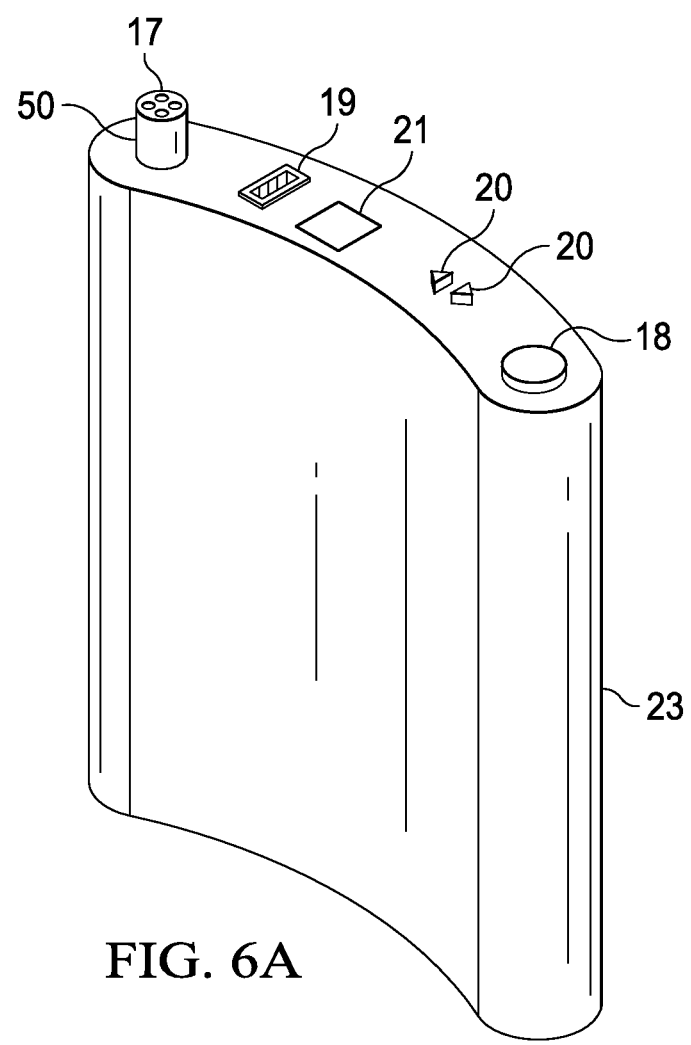
FIG. 6A is a perspective view of an exemplary detached power supply unit suitable for powering the modular LED lamp fixture shown in FIGS. 1A-1E.
Figure 6B:
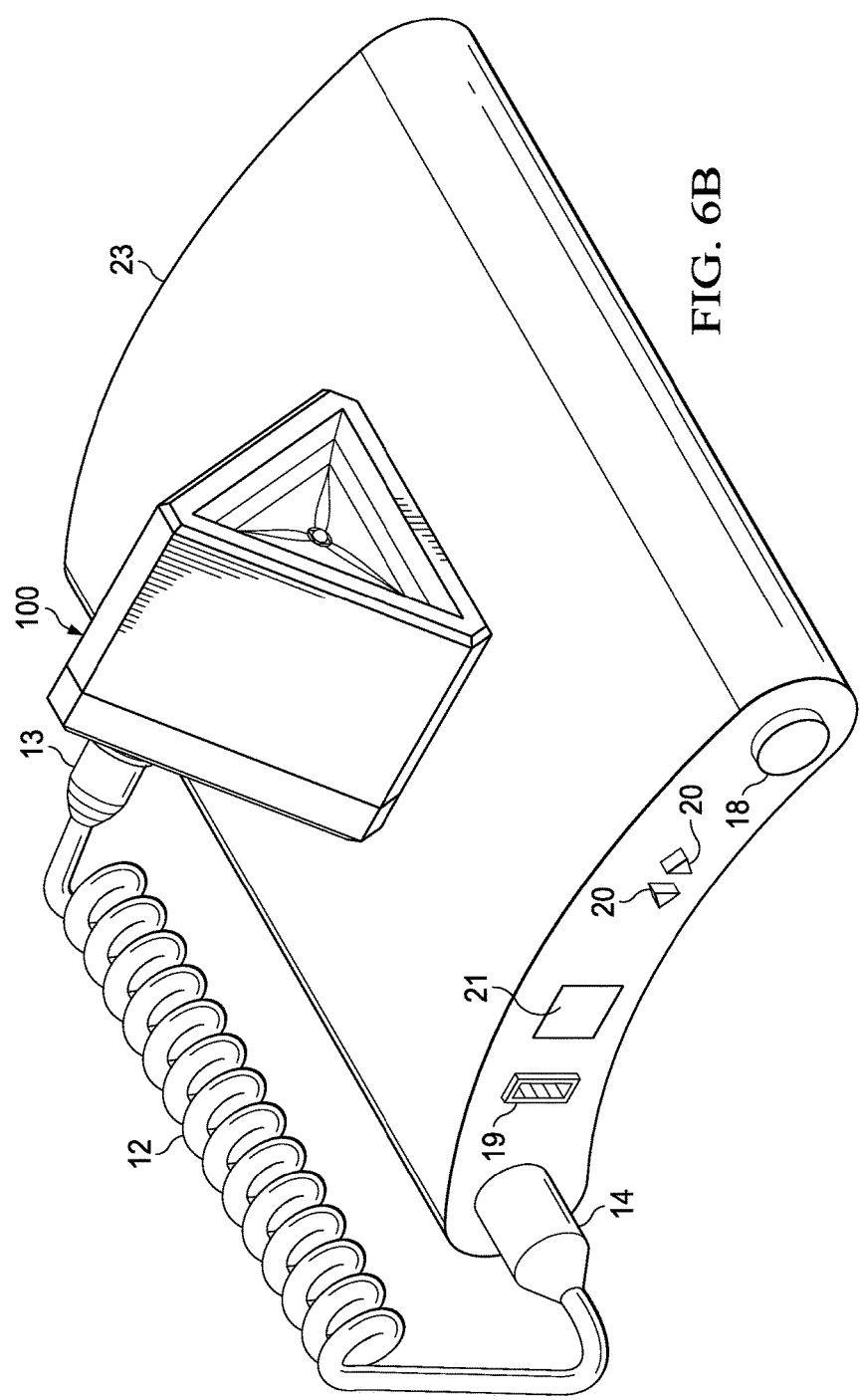
FIG. 6B is a perspective view of the power supply unit of FIG. 6A, as connected to the modular LED lamp fixture shown in FIGS. 1A-1E through the power and communications cord shown in FIG. 3.
Figure 6C:
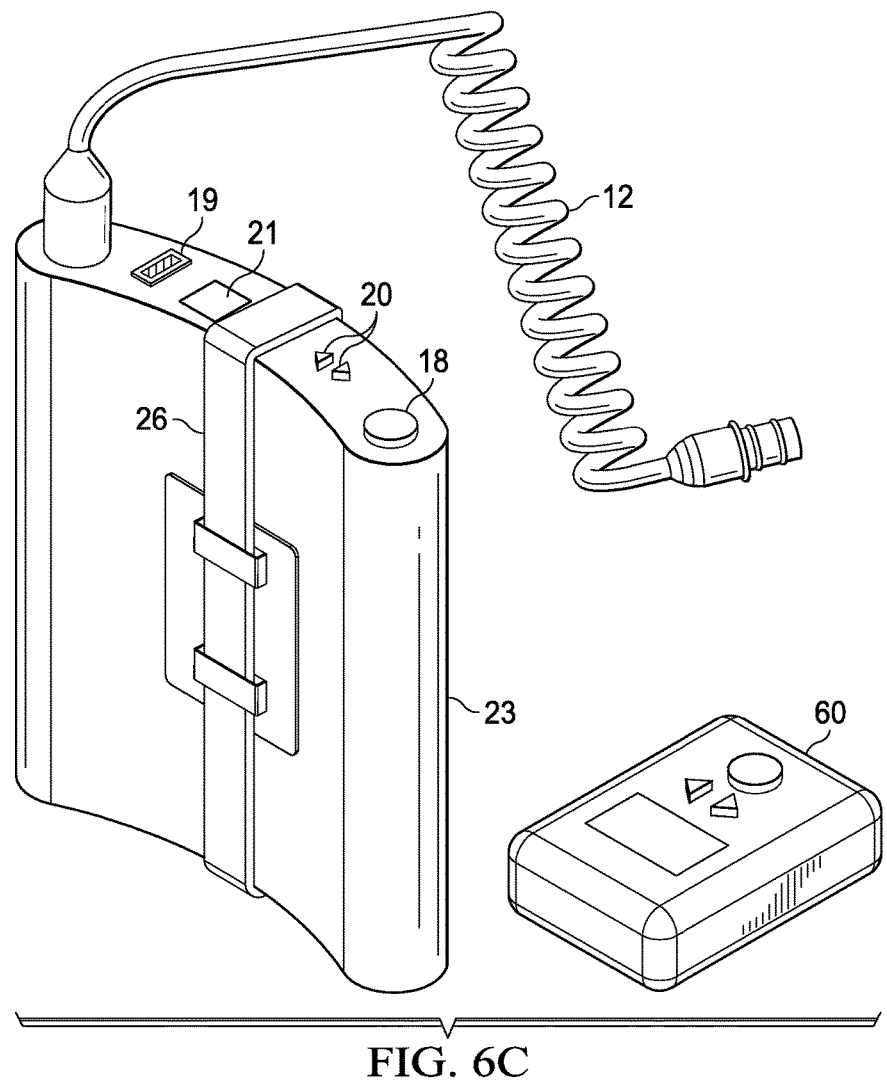
FIG. 6C is a perspective view of the power supply unit of FIG. 6A along with an exemplary strap assembly for transporting and securing the power supply unit.

FIG. 6A depicts a curved power module 23, which includes waterproof power activation switch 18, USB port 19, mode select switches 20, display screen 21, and plug connector 17 for mating with receptacle connector 14 of cable 12, as shown in FIG. 6B. FIG. 6C illustrates curved power module 23 within a case/mounting accessory 26 designed to carry and mount the curved power module 23 using MOLLE-style fastening straps or generic belt loop straps. While a curved version of power module 23 is shown in FIGS. 6A-6B, alternate shapes or forms that are ergonomically suitable for different environments and activities may also be used in different embodiments.

Preferably, power module 23 also comprises a rigid body enclosure containing Li-ion batteries and associated control logic and circuitry for connecting batteries and other electronic components to modular LED lamp assembly 100. The operating status shown on display 21 may include, for example, battery life, lamp operating mode (high, med, low, beacon, SOS, or any other programmed signal). Power module 23 may also include Wi-Fi, Bluetooth, or radio frequency transmitters and receivers to allow for remote control of power module 23, modular LED lamp assembly 100 or both. In addition, embedded transmitters allow for communication between a power module 23 and other Wi-Fi enabled devices, such as an iPhone, or DSLR cameras. USB port 19 preferably has a waterproofing rubber plug to keep out water and contaminants, although other sealing mechanisms can also be used.

Power module 23, cable 12, and one or more modular LED lamp assemblies 100 can be mounted as a unit, using any of the mounting systems discussed below. Alternatively, using cable 12, power module 23 and modular LED lamp assembly 100 can be spaced apart. For example, modular LED lamp assembly 100 can be secured to the user's body using straps or a similar system, while power module 23 is stored in a clothing pocket, backpack, or other pouch.

Outdoor adventurers need remote operating capability, because frequently they are physically separated from their gear and cannot push the operating controls. Additionally, photographers need to have well-timed and consistent lighting that is compatible with their different equipment. Advantageously, modular LED lamp fixture 100 and power modules embodying the principles of the present invention include wireless communications capability. Among other things, modular LED lamp fixture 100 and/or power modules 23 and 24 can be controlled remotely through a user's DSLR camera, iPhone, GoPro, a remote control, or any wireless-capable device programmed to connect with and operate the modular LED lamp fixture 100.

Some embodiments of the principles of the present invention include a remote control, which is preferably a simple hand-held device, which allows a user to control the functionality and operation of power modules 23 and 24. The remote control comprises a small rigid enclosure, encasing a battery, electronic chips, radio frequency transmitters, circuitry and other components normally making up a wireless remote control. In addition, the remote control includes a remote control has a digital display screen to display modes, data and functions of the different connected devices. Command buttons signal the power module being controlled. The remote can receive signals and data from power modules 23 and 24.

Figure 7A:
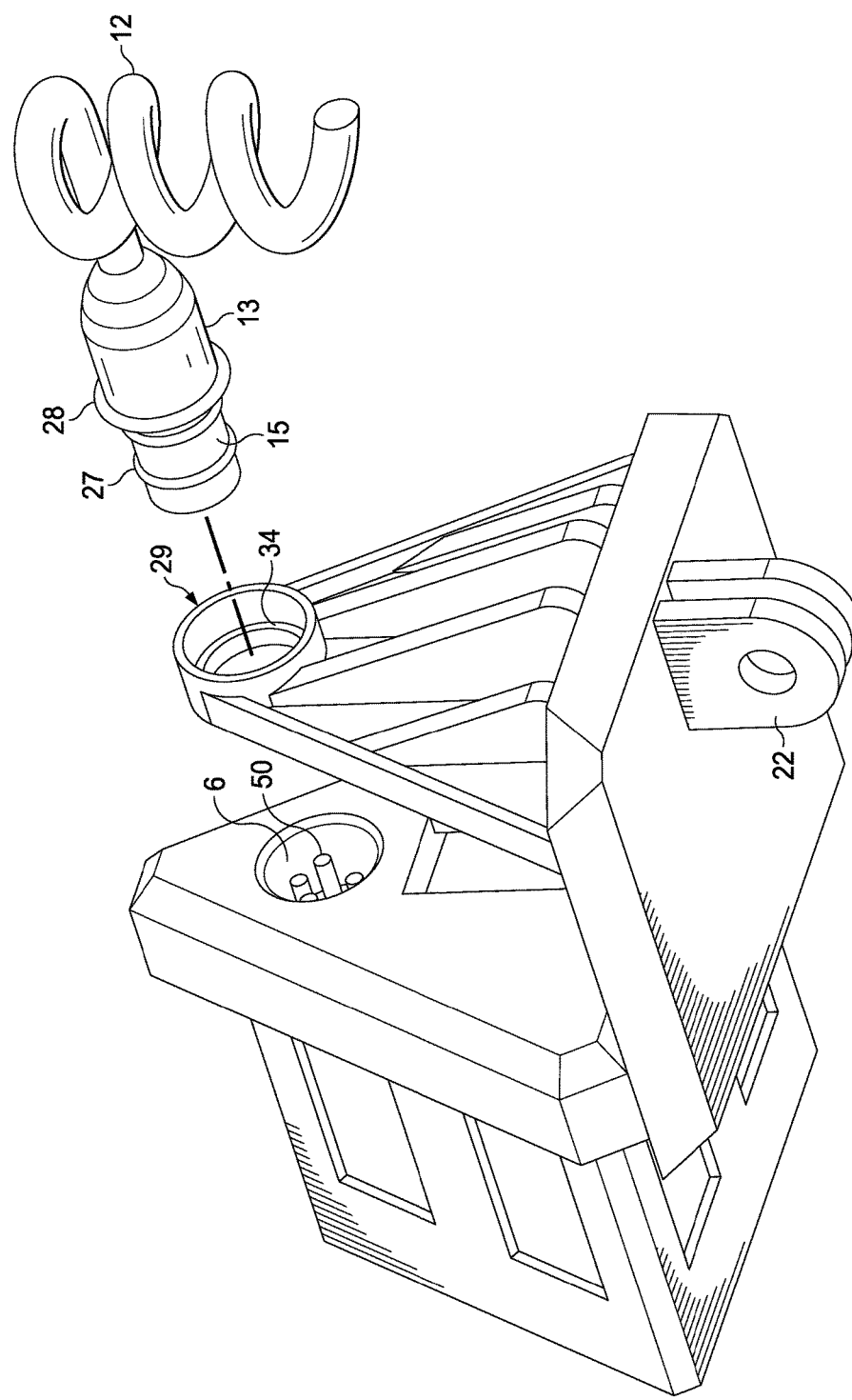
FIG. 7A is an exploded view of an assembly including the modular LED lamp fixture shown in FIGS. 1A-1E, the power and communications cable shown in FIG. 3, and a universal mounting base.
Figure 7B:
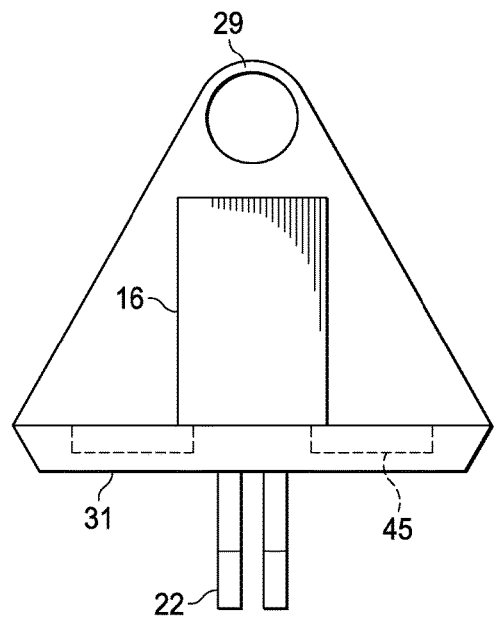
FIGS. 7B-7D are respective front, side, and top views of the universal mounting base shown in FIG. 7A.
Figure 7C:
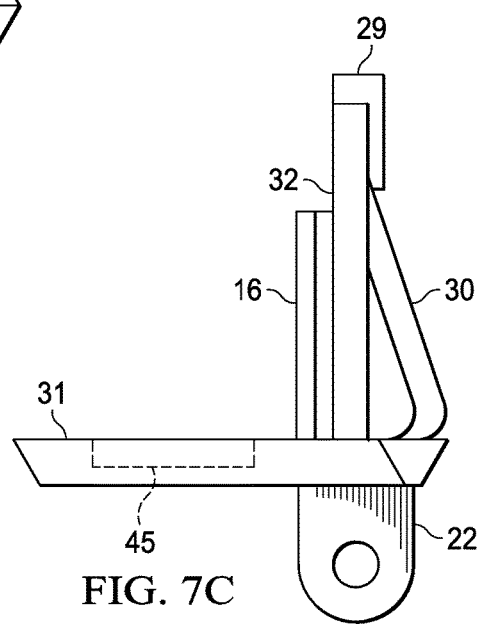
Figure 7D:
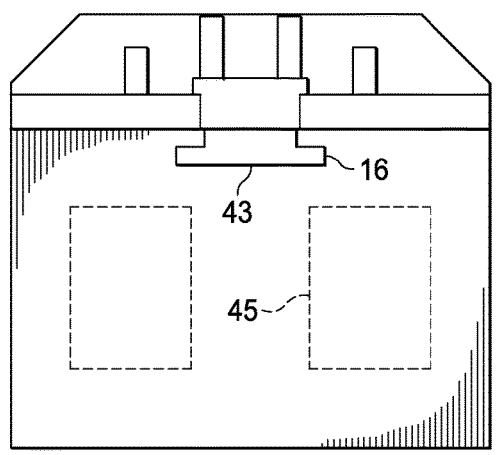

An assembly including modular LED lamp fixture 100, power and communications cable 12, and universal mounting baseplate 31, is shown in the exploded view of FIG. 7A. One particular embodiment of mounting baseplate 31, which is shown in further detail in FIGS. 7B-7D, includes a universal/GoPro-style mount structure 22, a lamp mount key 16, mounting key tongue 43, embedded baseplate magnets 45, mount back plate power and communications plug socket 29, mount back plate 32, and mount back plate support 30. In the embodiments of FIGS. 7A-7D, lamp mount key 16 is T-shaped and includes key tongue 43 and is dimensioned for sliding engagement with key cutout 5 on the back of modular LED lamp fixture 100.

In the assembly of FIG. 7A, lamp mount key 16 and mounting tongue 43 of universal mounting baseplate 31 slide into mounting keyway 5 on the backside of modular LED lamp fixture 100. Baseplate magnets 45 within universal mounting plate 31 engage reciprocal embedded magnets 11 on modular LED lamp fixture 100. Plug 13 of cable 12 extends through a back plate plug socket 29 to engage power and communications interface receptacle 6 on the back of modular LED lamp fixture 100. Molded lug snap ring 28 on cable plug 13 engages mounting baseplate socket snap function groove 34. Water proof gaskets 27 extending from plug mating surface 15 seal the connection between plug 13 and receptacle 6.

Advantageously, universal mount assembly 31 allows modular LED lamp fixture 100 to mate with other conventional mounting systems. In particular, universal mount base plate 31 and back plate 32 couple with modular LED lamp fixture 100 to form a rigid unit that can be mounted on to various conventional mounts, such as GoPro or DSLR camera mounts. Embedded baseplate magnets 45, which are preferably rare earth magnets, attract magnets 11 embedded in the bottom side of modular LED lamp fixture 100 and keep the surfaces modular LED lamp fixture 100 and the universal mount baseplate 31 firmly coupled together during use and handling.

Figure 7E:
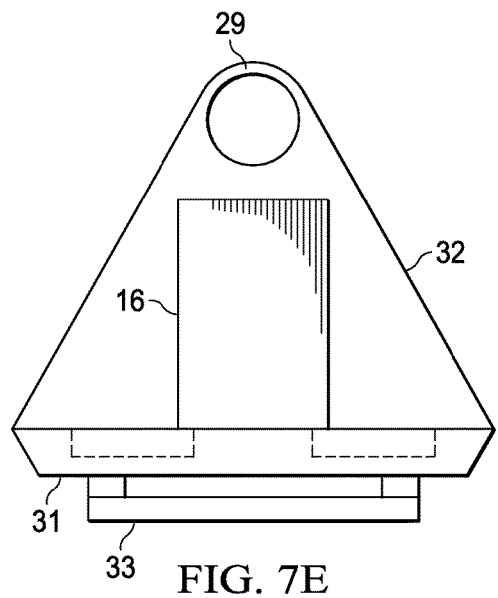
FIGS. 7E-7F are respective front and side views of an alternate universal mounting base.
Figure 7F:
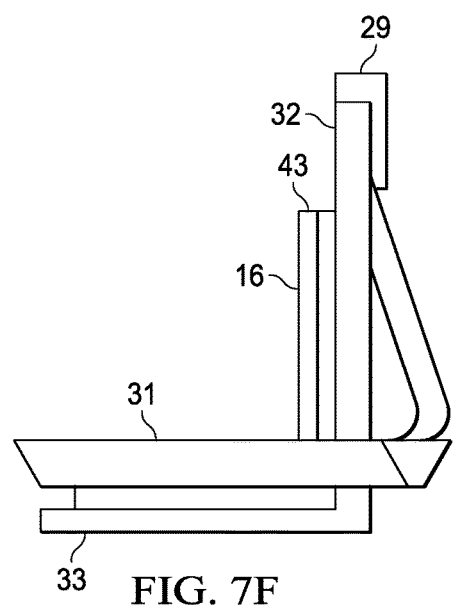

An alternate embodiment of universal mounting baseplate 31 in which the universal/GoPro-style mount structure 22 has been replaced with a "Hot shoe" mount structure 33 as the base is shown in FIGS. 7E-7F. In addition, in other embodiments, a standard hinge-mount could be supported by universal mounting plate 31.

Figure 7G:
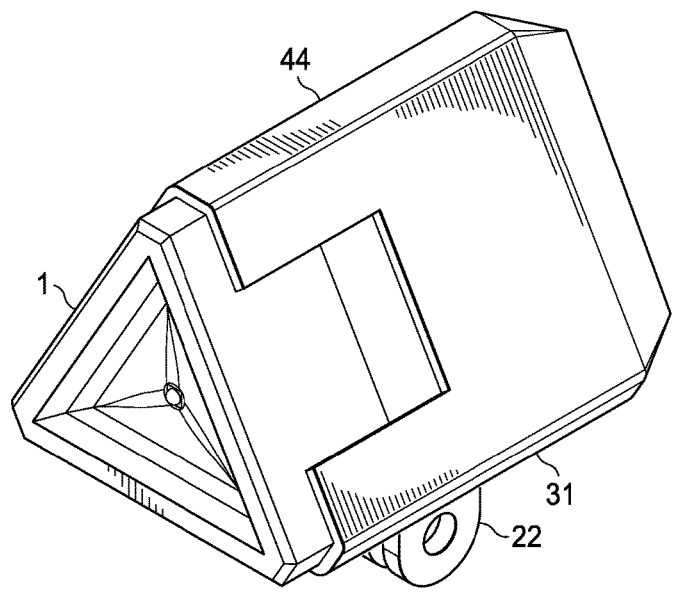
FIG. 7G is a perspective view of a combination power supply module and mounting assembly in which the modular LED lamp fixture shown in FIG. 1A-1E is received in a receptacle supporting a connector for engaging an external structure and connects with an integral power module or battery at the rear of the receptacle.

FIG. 7G illustrates a further combination power module and mounting assembly in which modular LED lamp fixture 100 is received in receptacle 44 supporting a pronged mount structure 22 for engaging reciprocal prongs on another structure to form a hinged connection. Modular LED lamp fixture 100 slides into receptacle 44 such that electrical receptacle 6 on modular LED lamp assembly 100 internally mates with a power module or battery forming the rear portion of power module and mounting assembly. Pronged mount structure 22 can be replaced with hot-shoe mount structure 33 in alternate embodiments.

Videographers and photographers may want easy ways to add lens filters, colored lenses, and diffusion lenses to change the look of the captured images. Additionally, military, civil and law enforcement users may want easy ways to adapt a single function lighting/signaling device to one that can create multiple signals or lighting outputs, with as minimal gear as possible.

Figure 8A:
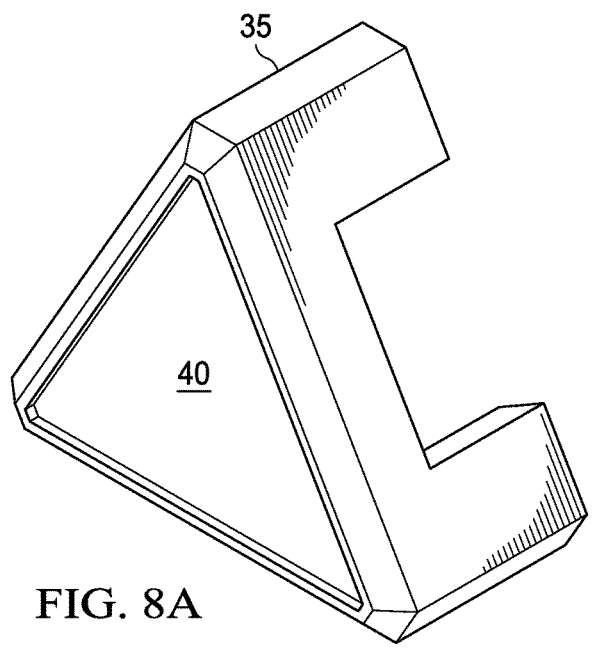
FIG. 8A is a perspective view of preferred interchangeable lens cap suitable for use with the modular LED lamp fixture shown in FIGS. 1A-1E.
Figure 8B:
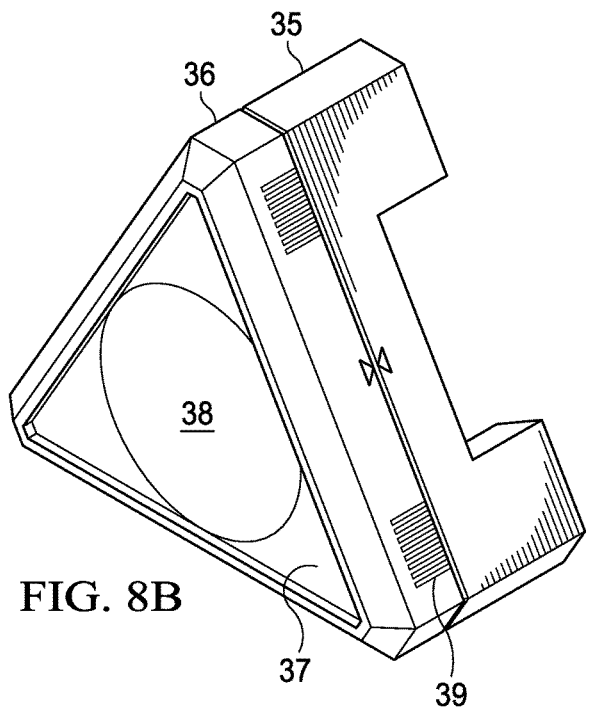
FIG. 8B is a perspective view of a telescoping focusing lens cap suitable for use with the modular LED lamp fixture of FIGS. 1A-1E.
Figure 8C:
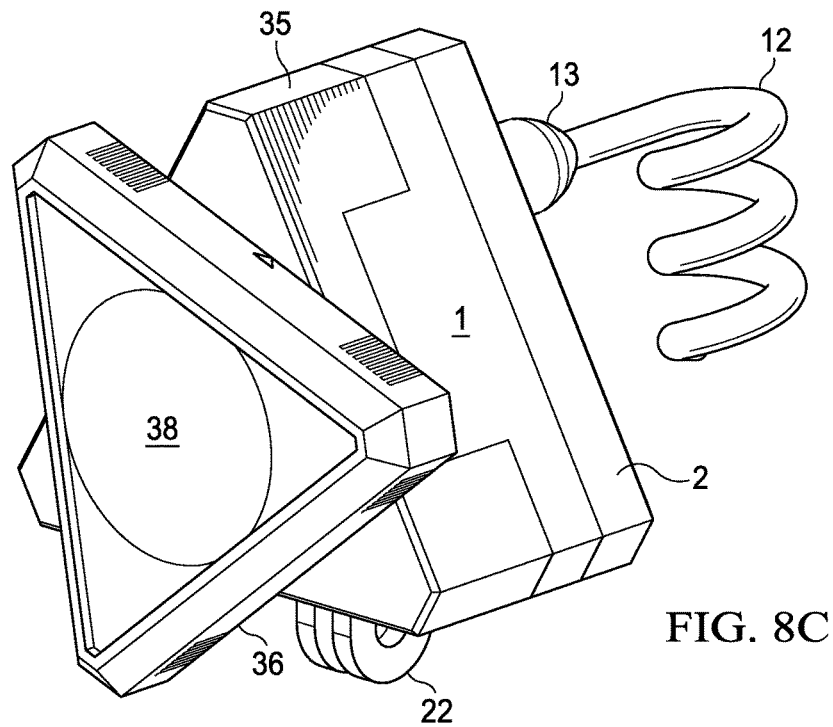
FIG. 8C is a perspective view of the interchangeable lens and telescoping focusing lens cap shown in FIGS. 8A-8B as attached to a representative modular LED lamp fixture in accordance with FIGS. 1A-1E.

FIGS. 8A-8C depict exemplary lens accessories that can be mounted on to outer housing 1 and baseplate 2 of modular LED lamp fixture 100. In particular, FIG. 8A shows a changeable lens 40, which snaps in to the lens cap base/mounting skirt 35. Base/mounting skirt 35 is adapted to slide over outer casing 1 of modular LED lamp fixture 100. Preferably, base/mounting skirt 35 magnetically couples with modular LED lamp fixture 100, temporarily affixing an interchangeable lens directly in front of epoxy lens layer 9 (FIG. 1A).

Different changeable lenses 40 have different colors or shades of color, or can also be etched or surface-treated to change the LED lamp output characteristics. Advantageously, interchangeable lenses can be snapped in-place and snapped out of place quickly and easily. Interchangeable lenses 40 can consist of rigid or semi-rigid transparent or translucent material.

FIG. 8B shows a telescoping focusing lens cap 36, including focusing lens 38, a protective lens 37, knurled or notched grip 39, and lens cap mounting base 35. Telescoping focusing lens cap 36 is shown mounted to modular LED lamp fixture 100 in FIG. 8C. Preferably lens cap mounting base 35 magnetically attaches to modular LED lamp fixture 100, as discussed above.

Telescoping focusing lens cap 36 temporarily affixes a variable focusing lens directly in front of epoxy lens layer 9 of modular LED lamp fixture 100. In particular, a main lens comprising one or more individual lenses is encased within mounting base 35. Focusing lens 36, disposed within focusing lens cap 36, is positioned at different distances from the main lens to adjust the focus beam or light coming from the modular LED lamp fixture 100.

Figure 8D:
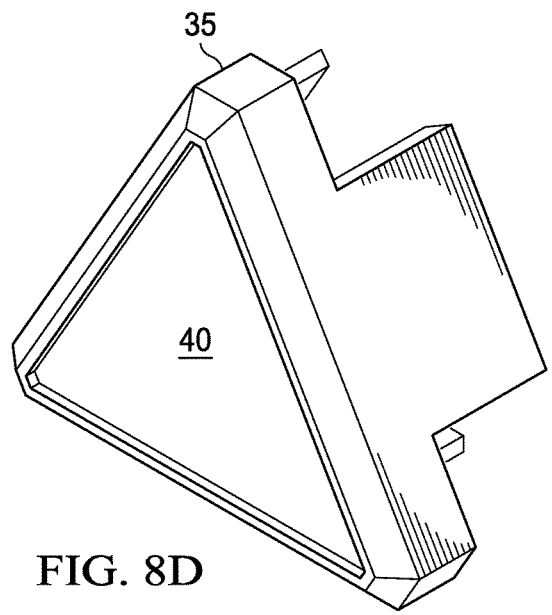
FIG. 8D is a perspective view of an alternate lens cap suitable for mating with the receptacle shown in FIGS. 4C and 7G.

FIG. 8D illustrates an alternate lens cap suitable for mating with receptacle 44 shown in FIGS. 4C and 7G.

Users who film and photograph their hobbies and activities may want easy ways to mount their high powered lights on to GoPro and DSLR cameras. The principles of the present invention provide for a tandem mounting system that allows users to mount modular LED lamp fixture 100 physically on a camera or other sporting or recreational device.

Figure 9A:
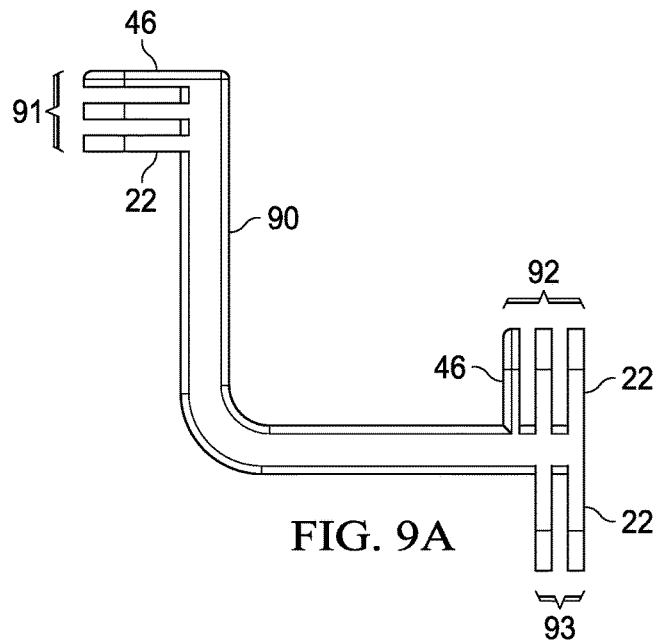
FIG. 9A-9C are respective side, end, and perspective views of a tandem mount suitable for use with the modular LED lamp fixture shown in FIGS. 1A-1E.
Figure 9B:
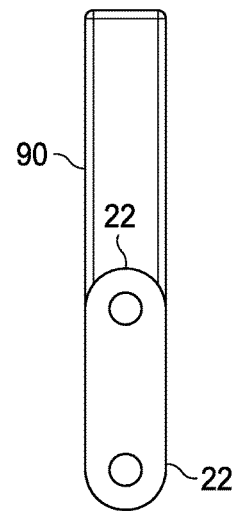
Figure 9C:
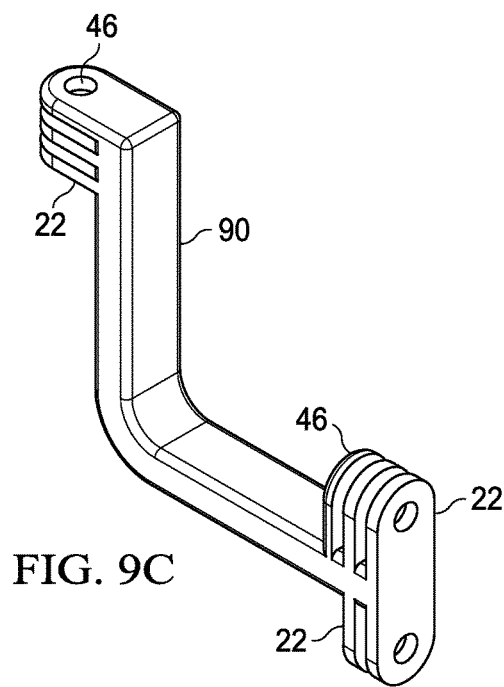

A representative universal tandem mount is shown in front, right side and perspective views in FIGS. 9A-9C. The embodiment of FIGS. 9A-9C is based on a three universal/GoPro-style mount structures 22, with threaded drill holes 46. One representative use of the universal tandem mount is discussed below in conjunction with FIGS. 12B and 12C.

Mounting structures 22 provide three independent mounting points 91, 92, and 93 for mounting separate components. As discussed below, when used with threaded thumbscrews and compatible mounting structures on the associated components, mounting structures 22 allow for the creation of mounting hinges at each of the three mounting points. The two three-prong mounting points 91 and 92, at the top and upper side positions, include at least one prong with a threaded hole 46 and are adapted to receive a two-prong mounting point connector. Each threaded hole 46 matches up with a mounting thumb screw, as shown in FIGS. 12B and 12C. Mounting point 93 includes two-prongs for engaging a reciprocal three-pronged connector to form a hinge.

Advantageously, the tandem mount eliminates the need for mounting hardware, with an exception to a single thumbscrew per mounting hinge. This in turn eliminates the need to buy special hardware, or to risk the chance of losing small hardware while packing or transiting the mounting system, and other gear and equipment.

Figure 10A:
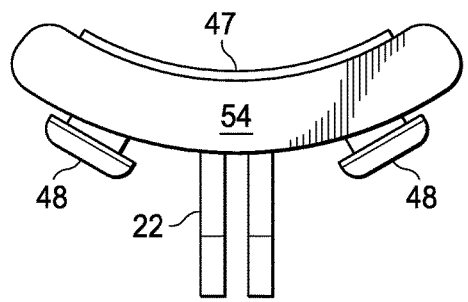
FIGS. 10A-10B are end and side views of a curved accessory mounting base.
Figure 10B:
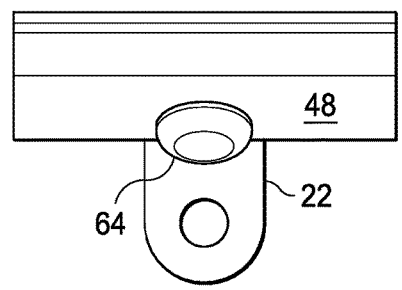
Figure 10C:
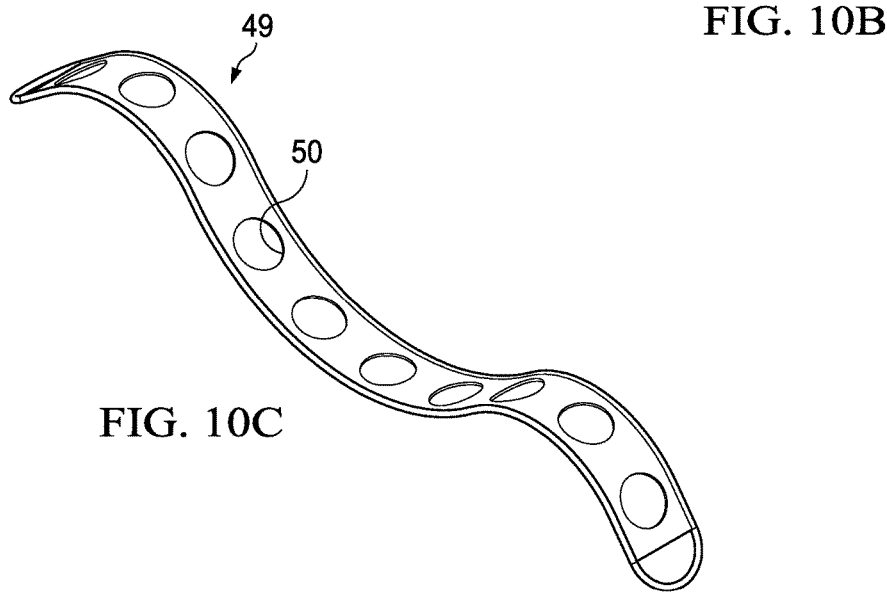
FIG. 10C illustrates a strap suitable for use with the curved accessory mounting base of FIGS. 10A 10B.

FIGS. 10A-10C depict a universal "curved" accessory mount with a curved mount base 54, a universal/GoPro-style mount structures 22 strap, fastening tabs 48, knurled grip 48, a rubber grip pad 47, and a high-tension, rubber fastening strap 49. One representative use of the universal accessory mount is discussed below in conjunction with FIGS. 12D and 12E.

Curved mount base 54 has a radius curvature and size that enables it to cradle different size cylindrical or tubular accessories, such a typical flashlight, on its mating surface. Apertures 50 through rubber fastening strap 49 and fastening tabs 48 allow cylindrical accessories or instruments of different diameters to be fastened to curved rigid mount base 54. Two-post mounting structure 22 can then be attached at a hinge point to a reciprocal structure such as mounting structures 22 of the tandem mount or those found on any GoPro mount. Preferably, at least the mating surface of curved rigid mounting base 54 includes a rubber grip pad 47 or similar resilient structure that aids against the accessory or flashlight from slipping around when strapped down.

FIGS. 11A-11I depict the effects of the magnetic flux produced by embedded magnets 10 and 11 in modular LED lamp fixture 100, magnets 45 in universal mounting baseplate 31, magnets 65 in power module 23, and magnets embedded within curved power module 23.

Figure 11A:
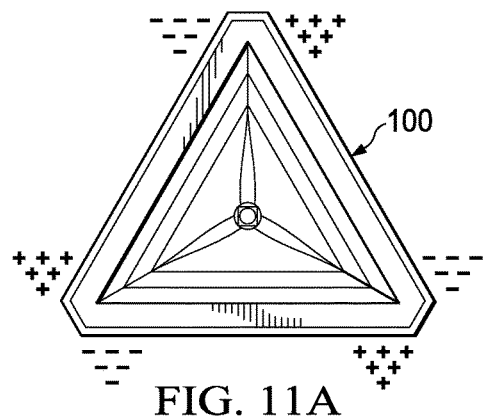
FIGS. 11A-11I are a series of views demonstrating the ability to magnetically attach the modular LED lamp fixture shown in FIGS. 1A-1E to various other structures to create lighting assemblies.
Figure 11B:
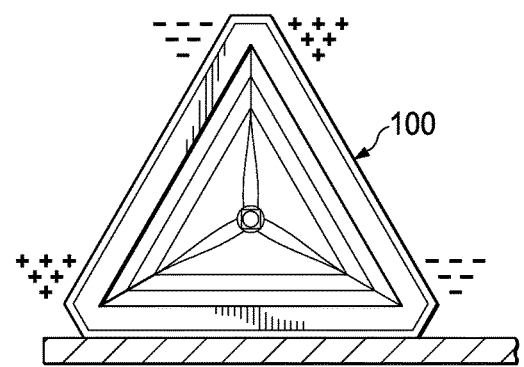
Figure 11C:
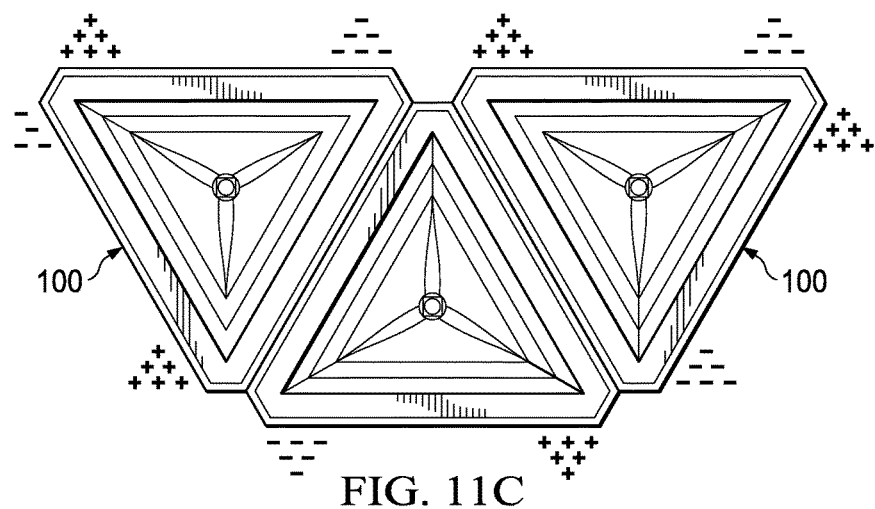
Figure 11D:
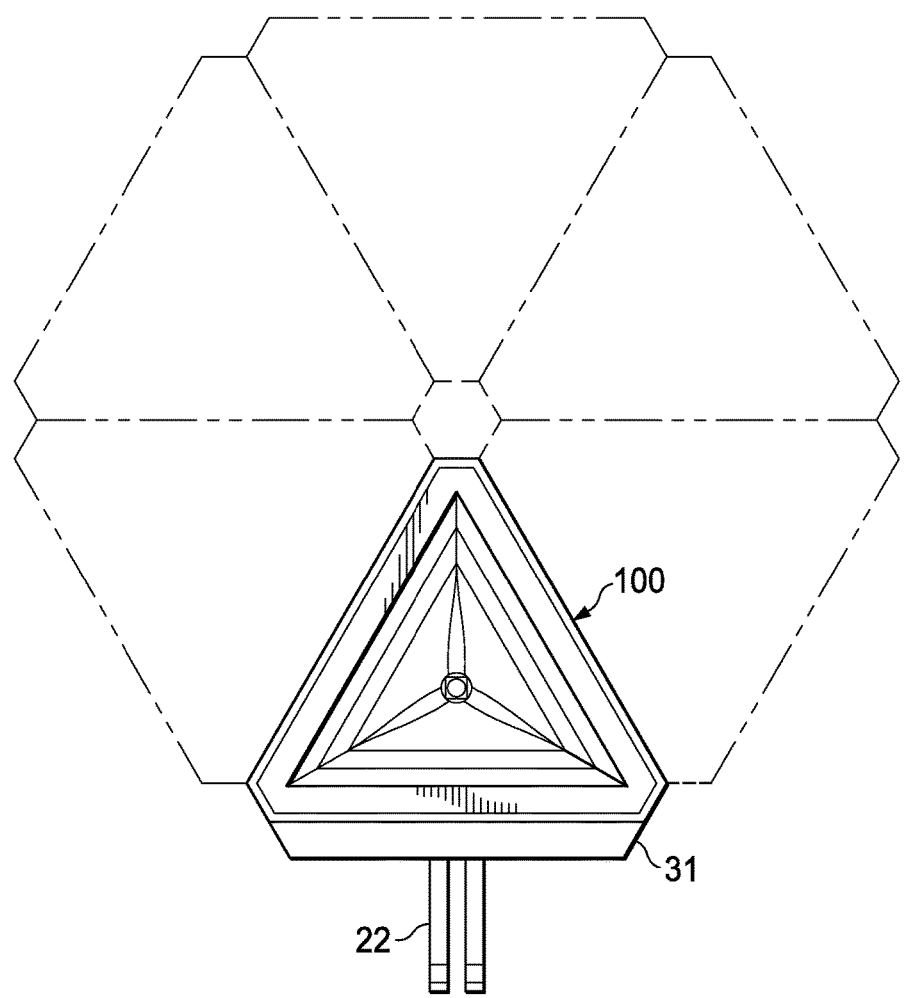
Figure 11E:
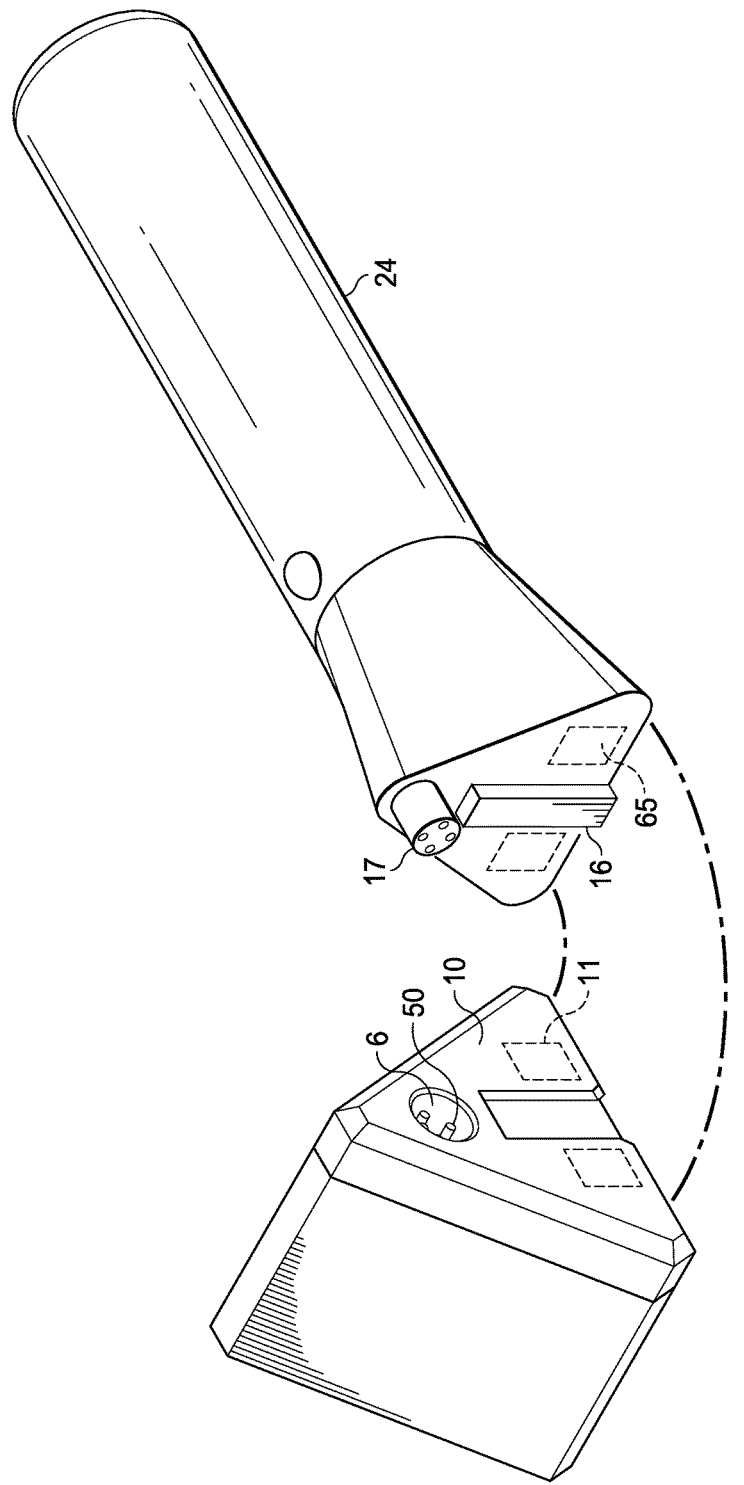

In particular, as shown in FIGS. 11A-11D, by placing magnets 11 of alternate polarities in adjacent modular LED lamp fixtures 100, various lighting arrays can be created, for example, to increase the number of lumens available. In addition to mounting key 16 on power module 24 and keyway cutout 5 on modular LED lamp assembly 100, power module 24 and modular LED lamp fixture 100 may be physically connected as a hand-held unit through adjacent magnets 11 and magnets 65 of opposing polarity, as shown in FIG. 11E.

Figure 11F:
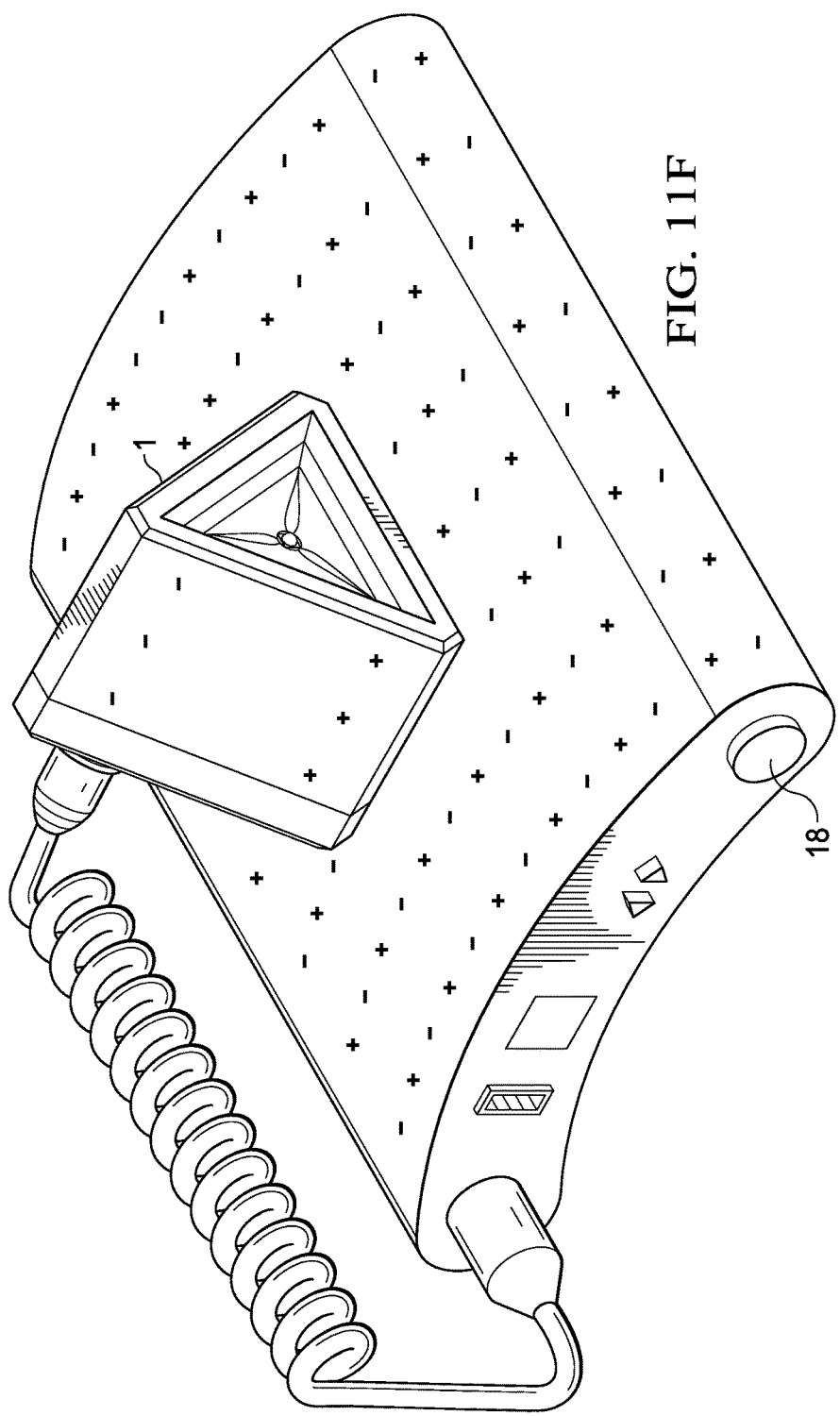
Figure 11G:
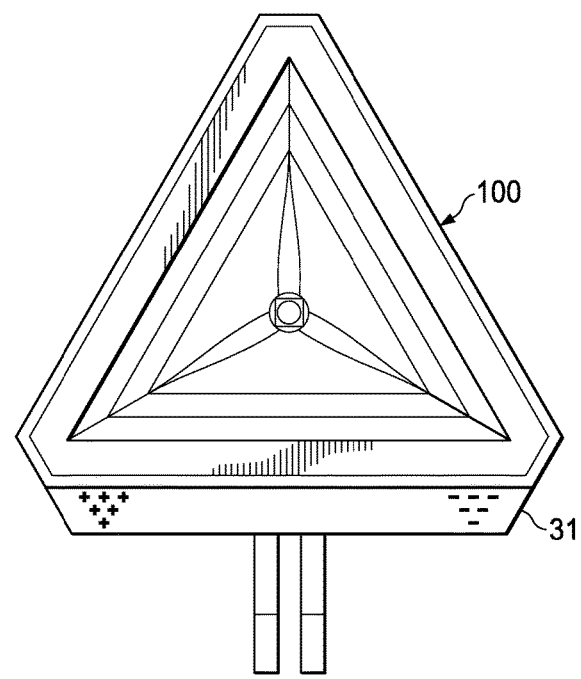
Figure 11H:
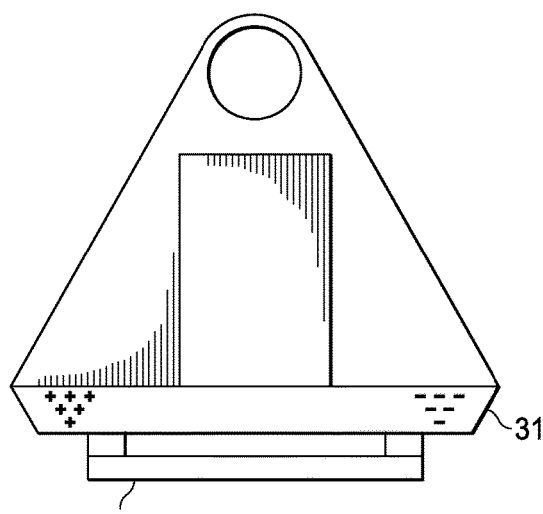
Figure 11I:
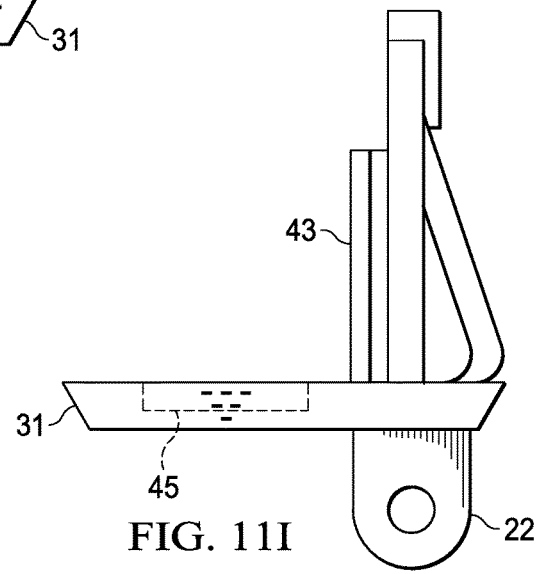

As shown in FIG. 11F, magnets embedded within curved power module 23 and embedded magnets 11 of opposing polarity within modular LED lamp fixture 100 can also be used hold the modular LED lamp fixture 100 and its corresponding power supply together for transport or storage. FIGS. 11G-11I depict one possible magnetic polarity arrangement of magnets 45 embedded within the alternate embodiments of universal lamp mounting plate 31, with magnets 45 adjacent to magnets 11 of opposite polarity within modular LED lamp fixture 100 (see FIG. 11A).

Figure 12A:
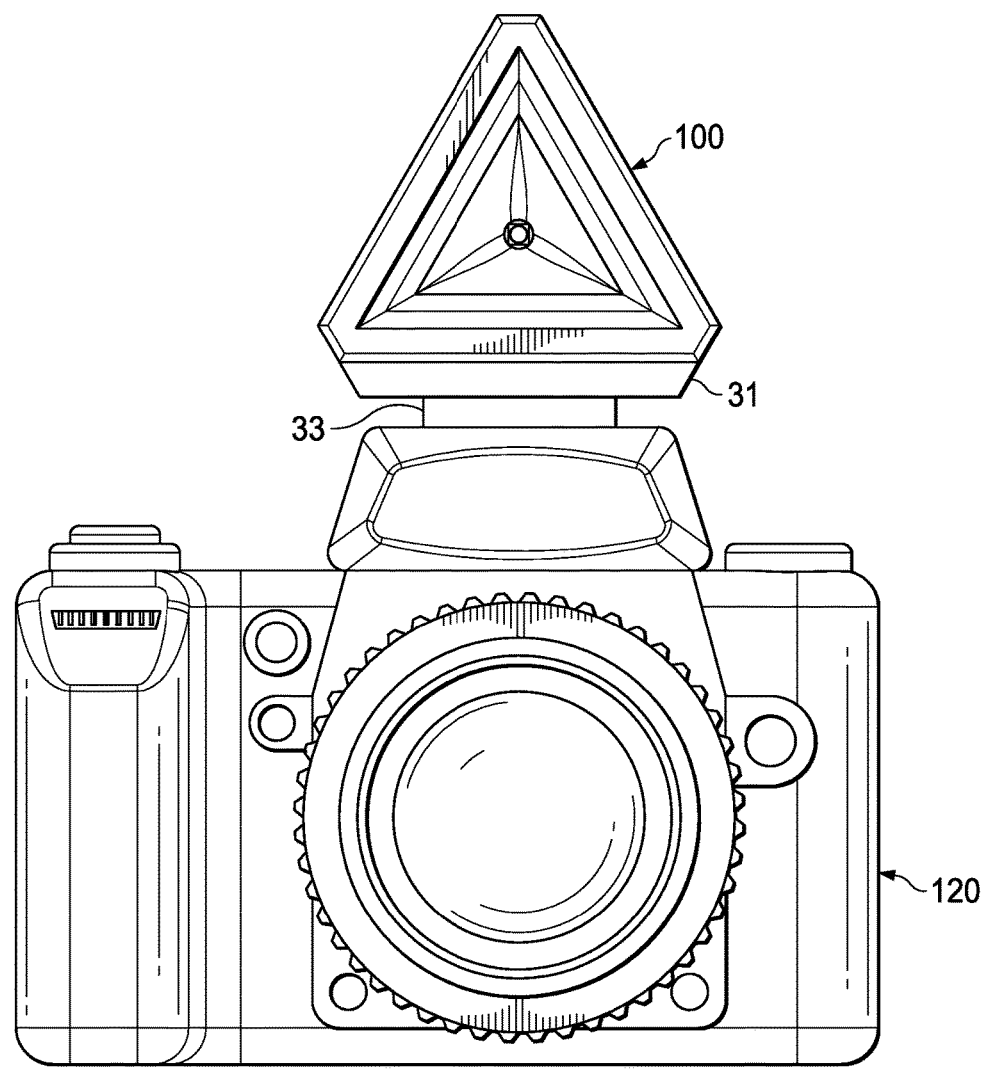
FIG. 12A is a front view of an exemplary DLSR camera to which the modular LED lamp fixture shown in FIGS. 1A-1E is attached using the universal mounting base of FIGS. 7E-7F.
Figure 12B:
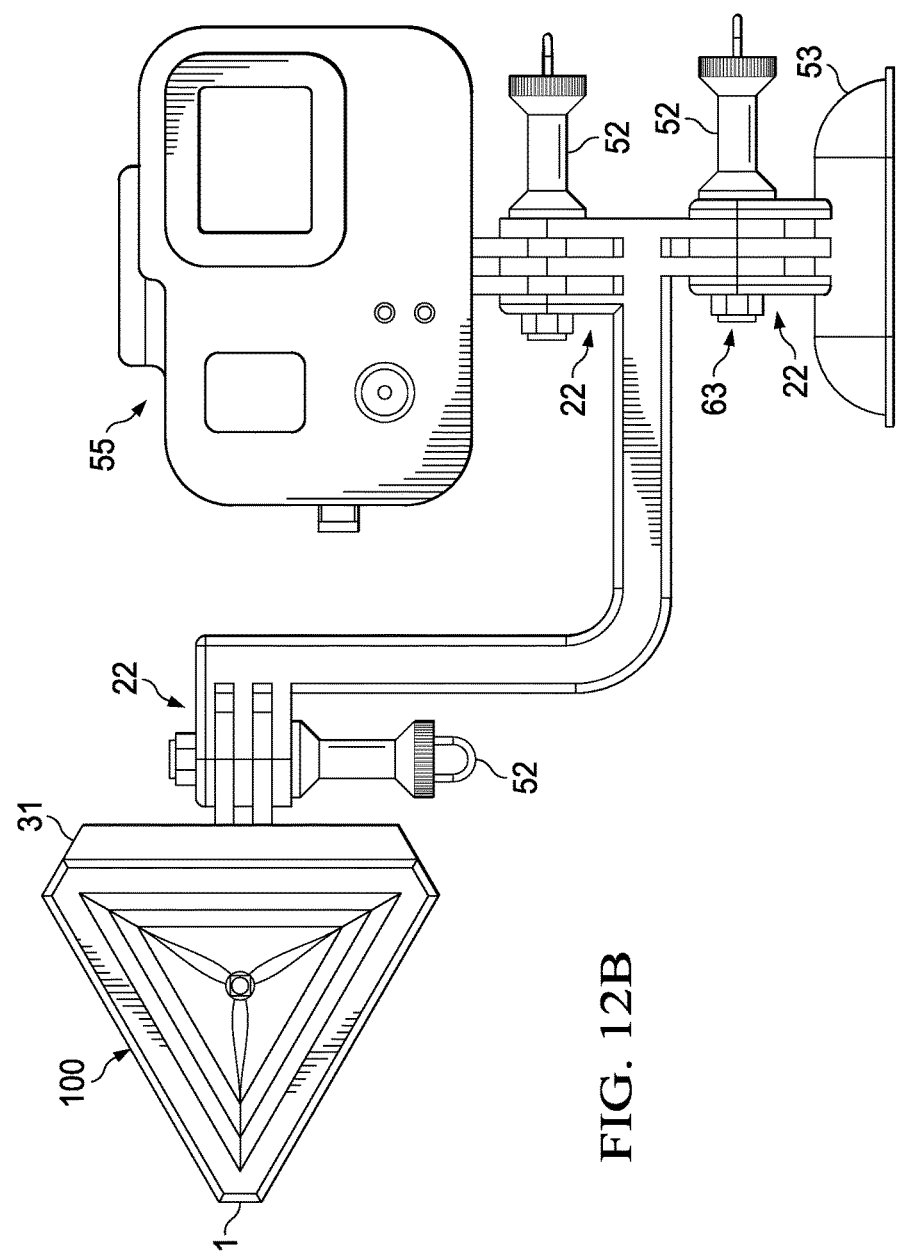
FIG. 12B is a front view of an exemplary Go Pro-type camera attached to the modular LED lamp fixture shown in FIGS. 1A-1E using the tandem mount shown in FIGS. 9A-9C.
Figure 12C:
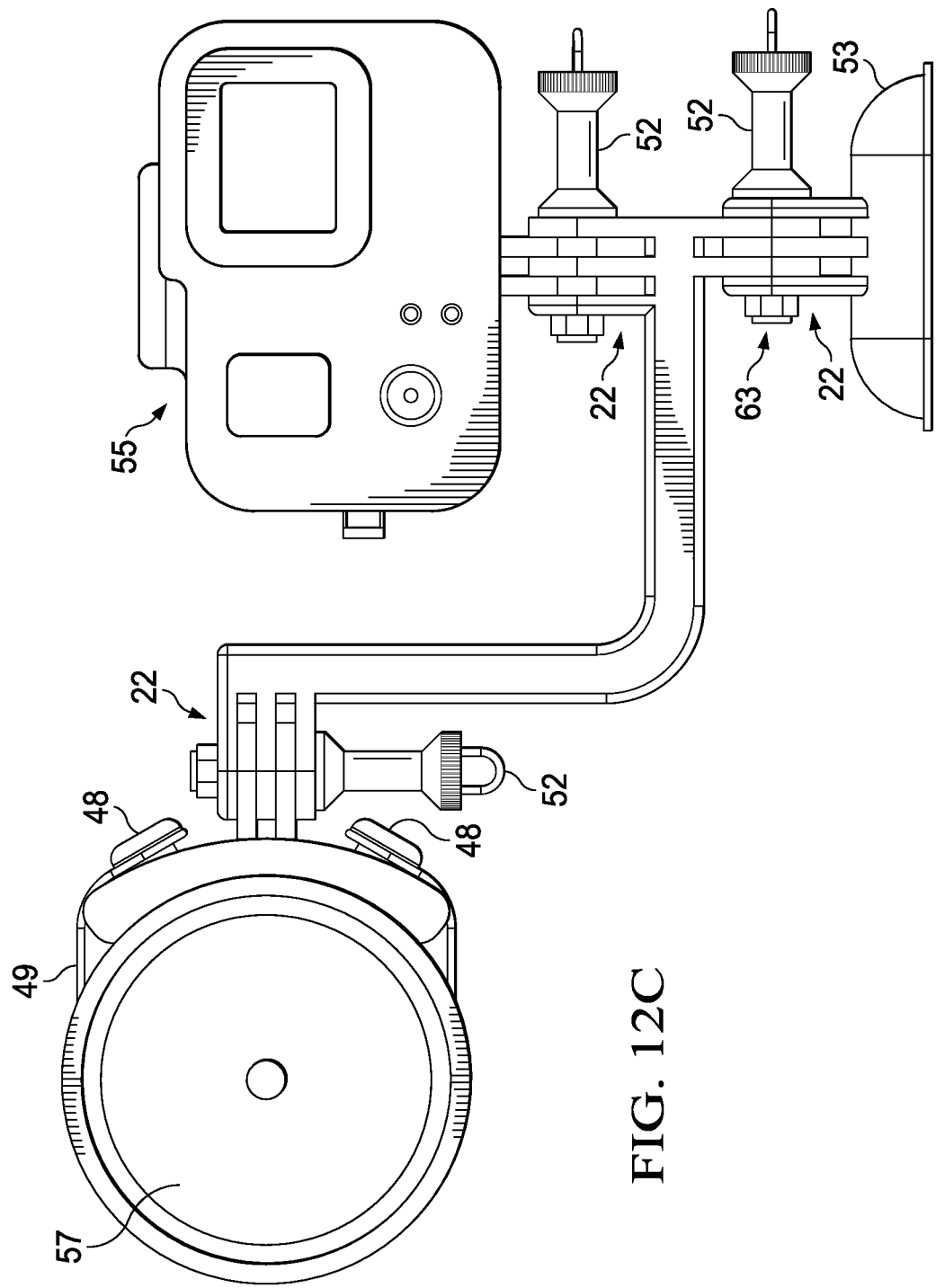
FIG. 12C is a front view of an exemplary Go Pro-type camera attached to a flashlight using the tandem mount shown in FIGS. 9A-9C and the curved mounting base of FIGS. 10A-10B and the strap of FIG. 10C.

FIGS. 12A-12F depict representative uses of modular LED lamp fixture 100 in conjunction with the accessories described above. Specifically, FIG. 12A depicts a modular LED lamp fixture 100 directly mounted to a DSLR camera 120 using the embodiment of universal mounting baseplate 31 with a hot shoe base 33 shown in FIGURES.

FIG. 12B illustrates the use of the universal tandem mount of FIGS. 9A-9C, along with threaded thumb screws 52, GoPro-style mount base 53, and optional mounting nuts 62. Each machined thumb screw 52 threads into a corresponding threaded hole 42 bolt 62 to form a hinge-pin, which locks two hinged parts radially. GoPro camera 55 is mounted on Go-Pro-style mount base 53 through a pair of hinges created by pairs of reciprocal mounting structures 22 and a pair of mounting thumb screws 52. A modular LED lamp fixture 100 is mounted to a third hinge by a third mounting structure 22 and associated thumb screw 52.

FIG. 12C illustrates the use of the tandem mount of FIGS. 9A-9C, as well as the universal accessory mount of FIGS. 10A-10C. The connections between Go-Pro camera 55 and the tandem mount is similar to those shown in FIG. 12B. In this example, a flashlight 57 is attached at the third hinge point through rubber grip pad 47, curved base 54, and high-tension, rubber fastening strap 46.

Figure 12D:
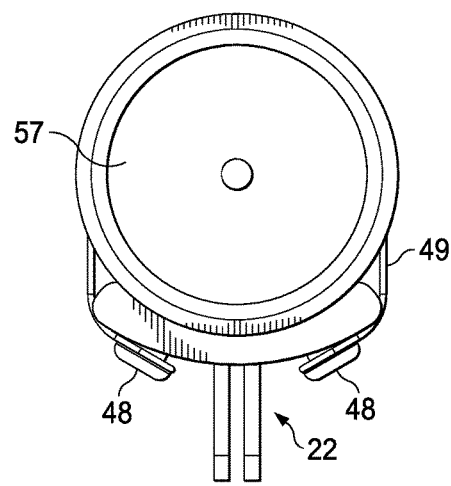
FIGS. 12D-12E are respective end and side views of a flashlight attached to the curved mount of FIGS. 10A-10B using the strap of FIG. 10C.
Figure 12E:
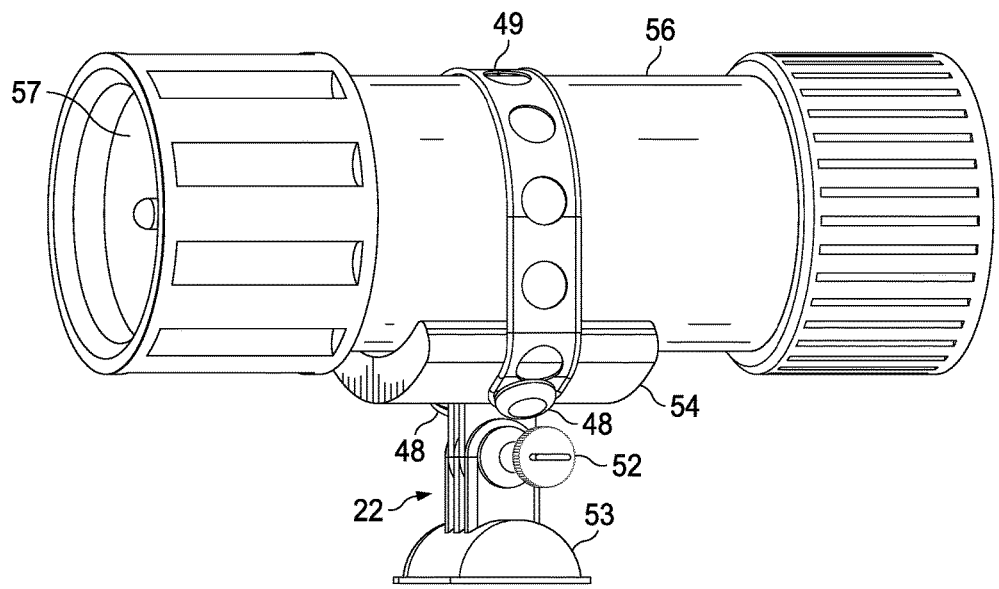
Figure 12F:
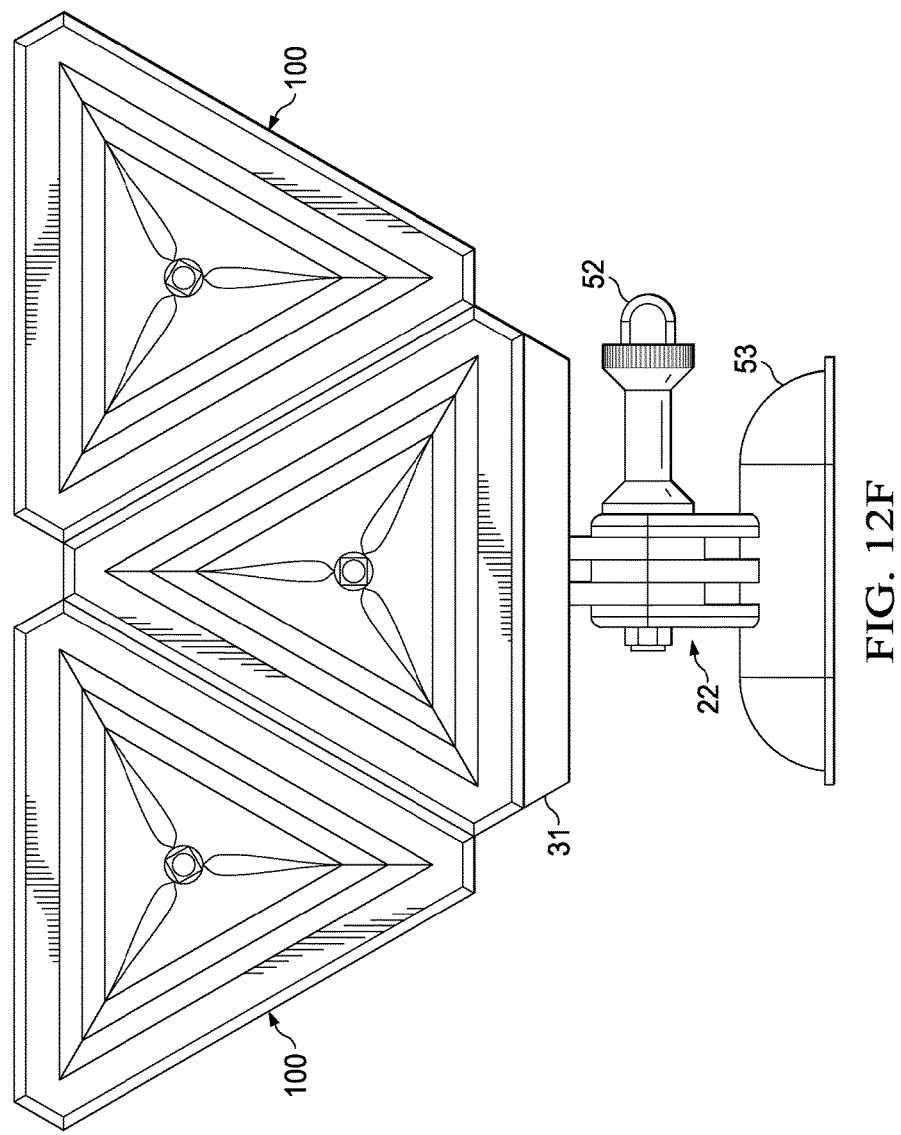
FIG. 12F is a front view of an array of the modular LED lamp fixtures shown in FIGS. 1A-1E attached to a Go-Pro-style base.

FIGS. 12D and 12E illustrate an exemplary assembly including the universal accessory mount of FIGS. 10A-10C, a GoPro camera 55, Go Pro-style mounting base 53, and a flash light 57. A representative assembly including an array of three modular LED lamp fixtures 100 supported on a GoPro-style mount base 53 is shown in FIG. 12F.

Figure 13:
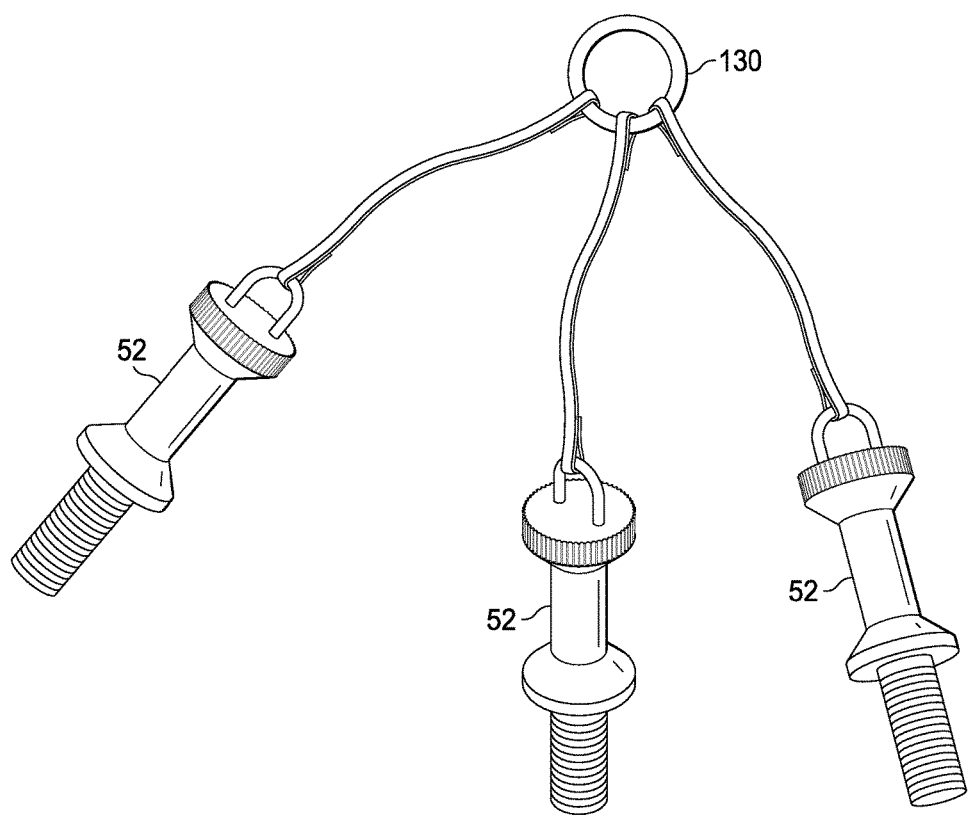
FIG. 13 is a front view of leash suitable for use with the thumb screws of FIGS. 12B and 12C.

Threaded thumb screws 52 shown in the various assemblies of FIGS. 12A-12F can be held together for storage and transport using a leash 130 shown in FIG. 13.

Figure 15A:
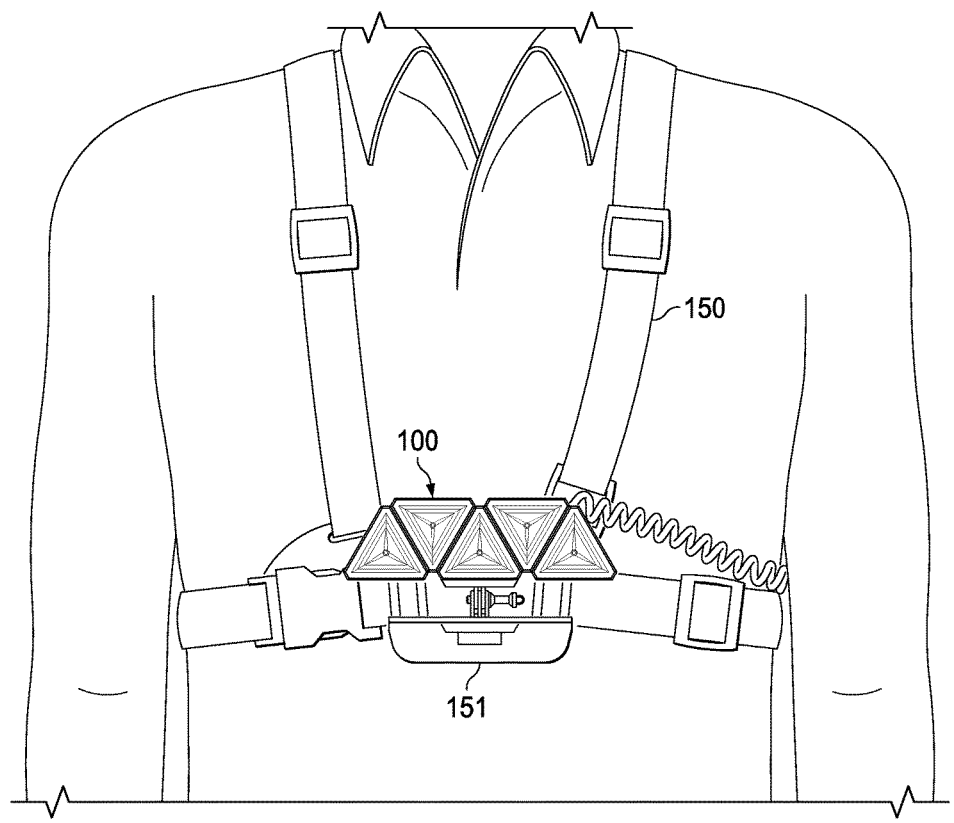
FIGS. 15A-15B are conceptual views showing exemplary uses of arrays of the modular LED lamp fixture shown in FIGS. 1A-1E as attached to a users body by a harness or similar support structure.
Figure 15B:
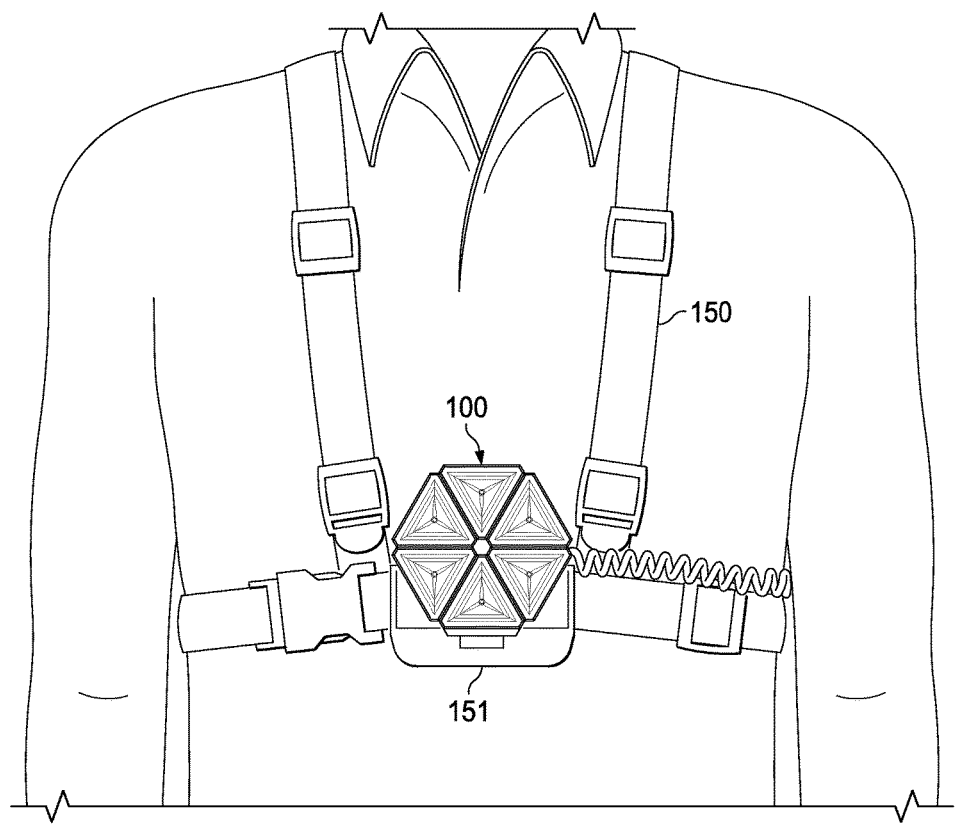

Modular LED lamp fixture 100 can be used in a wide range of different outdoor applications and under a wide range of different environmental conditions. FIG. 14 illustrates modular LED lamp fixture 100 being used on small boat using a support structure 140. FIGS. 15A and 15B show arrays of modular LED lamp fixtures 100 being carried by a user with a harness assembly 150 and support base 151.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A lamp fixture comprising:
   a light emitting diode supported on a front surface of a printed circuit board;
   a reflector and heat sink having a rear surface disposed adjacent the front surface of the printed circuit board and an opposing reflective surface defining a reflector dish, an aperture through the reflector and heat sink allowing the light emitting diode to extend from the printed circuit board into the reflector dish;
   an epoxy lens disposed over and sealing the reflective surface and the light emitting diode;
   an assembly including a base and an inner casing extending from the base for supporting the printed circuit board and the reflector; and
   an outer casing enclosing the inner casing and having front end including an aperture for outputting light transmitted through the epoxy lens from the light emitting diode and the reflective surface.

2. The lamp fixture of claim 1, wherein a cavity is defined within sidewalls of the inner casing for receiving electrical circuitry disposed on a rear surface of the printed circuit board, the cavity at least partially filled with heat transfer epoxy encapsulating and sealing the electrical circuitry.

3. The lamp fixture of claim 1, wherein the outer casing, the inner casing, and the base have a triangular shape.

4. The lamp fixture of claim 1, wherein reflective surface of the reflector and heat sink define a generally triangular shaped reflector dish.

5. The lamp fixture of claim 1, further comprising an electrical connector disposed on a rear surface of the base for establishing electrical connections with the printed circuit board.

6. The lamp fixture of claim 1, further comprising a mounting keyway disposed on a rear surface of the base for coupling the lamp fixture to another structure.

7. The lamp fixture of claim 1, further comprising a lens assembly including:
   a removable lens base adapted to receive the front end of the outer casing; and
   an interchangeable lens removably coupled to the lens base.

8. The lamp fixture of claim 1, further comprising a lens assembly including:
   a removable lens base adapted to receive the front end of the outer casing; and
   a telescoping lens supported by the lens base.

9. A lighting system comprising:
   a lamp fixture including:
      a base;
      a light emitting diode;
      a reflector including a reflective surface surrounding the light emitting diode;
      an lens adjacent to the reflective surface and the light emitting diode;
      an inner casing extending from the base and supporting the reflector, the light emitting diode, and the lens;
      an outer casing enclosing the inner casing and having a front end including an aperture for outputting light transmitted through the lens from the light emitting diode and the reflective surface;
      an attachment device for selectively attaching the lamp fixture with second structure; wherein the attachment device comprises a mounting keyway disposed in the base for engaging a mounting key disposed on the second structure; and a mounting baseplate including a key for engaging the mounting keyway on the base of the lamp fixture and a set of prongs for engaging a reciprocal set of prongs disposed on a third structure to form a hinged attachment between the mounting baseplate and the third structure.

10. The lighting system of claim 9, wherein the attachment device comprises a magnet disposed within a sidewall of the inner casing and enclosed within the outer casing.

11. The lighting system of claim 10, further comprising a second lamp fixture having a reciprocal magnet for magnetically coupling the lamp fixture and the second lamp fixture to form a lighting array.

12. The lighting system of claim 9, wherein the attachment device comprises a magnet disposed within the base.

13. The lighting system of claim 9, wherein the base of the lamp fixture includes an electrical connector and the lighting system further comprises:
a modular power supply having an electrical connector adapted to mate with the electrical connector disposed on the base of the lamp fixture and a key adapted engage the mounting keyway on the base of the lamp fixture to form a hand-held lighting unit.

14. The lighting system of claim 9, further comprising:
a mounting baseplate including a key for engaging the mounting keyway on the base of the lamp fixture and a hot shoe for slidably engaging a third structure.

15. The lighting system of claim 9, wherein the attachment device comprises a set of prongs extending from a selected surface of a selected one of the outer casing and the base of the lamp fixture for engaging a reciprocal set of prongs disposed on the second structure to form a hinged attachment between the lamp fixture and the second structure.

16. The lighting system of claim 15, further comprising:
a tandem mount including the reciprocal set of prongs and at least one other set of prongs for engaging reciprocal prongs on a third structure to form a hinged attachment between the tandem mount and the third structure.

17. The lighting system of claim 9, further comprising a battery at least partially enclosing the outer casing of the lamp fixture.

* * * * *